(12) United States Patent
Murad et al.

(10) Patent No.: US 12,162,041 B2
(45) Date of Patent: *Dec. 10, 2024

(54) SYSTEMS AND METHODS FOR WASTE ITEM DETECTION AND RECOGNITION

(71) Applicant: INTUITIVE ROBOTICS, INC., Vancouver (CA)

(72) Inventors: Hassan Murad, Coquitlam (CA); Vivek Hiteshbhai Vyas, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,514

(22) Filed: Nov. 22, 2022

(65) Prior Publication Data

US 2023/0136451 A1     May 4, 2023

Related U.S. Application Data

(63) Continuation of application No. 16/648,877, filed as application No. PCT/CA2018/051170 on Sep. 19, 2018, now Pat. No. 11,504,749.

(60) Provisional application No. 62/560,244, filed on Sep. 19, 2017.

(51) Int. Cl.
| | |
|---|---|
| *B07C 5/342* | (2006.01) |
| *G06F 18/214* | (2023.01) |
| *G06F 18/24* | (2023.01) |
| *G06T 7/70* | (2017.01) |
| *G06V 10/82* | (2022.01) |
| *G06V 40/10* | (2022.01) |

(52) U.S. Cl.
CPC ............ *B07C 5/342* (2013.01); *G06F 18/214* (2023.01); *G06F 18/24* (2023.01); *G06T 7/70* (2017.01); *G06V 10/82* (2022.01); *G06V 40/10* (2022.01)

(58) Field of Classification Search
None
See application file for complete search history.

(56) References Cited

U.S. PATENT DOCUMENTS

| | | | |
|---|---|---|---|
| 6,625,317 B1 | 9/2003 | Gaffin et al. | |
| 7,986,874 B2 | 7/2011 | Cheng et al. | |
| 9,573,167 B2 | 2/2017 | Marrapodi et al. | |
| 11,504,749 B2 * | 11/2022 | Murad | G06T 7/70 |
| 2007/0029232 A1 | 2/2007 | Cowling et al. | |
| 2013/0114889 A1 | 5/2013 | Ueki | |
| 2014/0379588 A1 | 12/2014 | Gates et al. | |
| 2016/0078414 A1 | 3/2016 | Rathore et al. | |

(Continued)

FOREIGN PATENT DOCUMENTS

EP      0824042 A1    2/1998

OTHER PUBLICATIONS

WIPO, Written Opinion and International Search Report of International Application No. PCT/CA2018/051170 dated Dec. 20, 2018.

*Primary Examiner* — Leon Flores
(74) *Attorney, Agent, or Firm* — Norton Rose Fulbright Canada LLP; Maya Medeiros

(57) ABSTRACT

Embodiments described herein relate to hardware and software for waste item detection and recognition, along with an education or feedback system. Embodiments described herein use artificial intelligence, which embodies machine learning and computer vision, to detect waste items and generate feedback to nudge the user to dispose the waste items into appropriate receptacles while generating smart operational insights of a designated premise.

27 Claims, 20 Drawing Sheets

(56) References Cited

U.S. PATENT DOCUMENTS

2017/0120301 A1   5/2017  Wang
2018/0232822 A1   8/2018  Bohn et al.

* cited by examiner

SYSTEMS AND METHODS FOR WASTE ITEM DETECTION AND RECOGNITION

FIELD

The present disclosure generally relates to the field of artificial intelligence and waste management. More particularly, the present disclosure relates to hardware and software for embedding artificial intelligence systems that utilize machine learning and computer vision to attempt to increase waste diversion rates.

INTRODUCTION

Landfills have placed an ominous effect on the environment and consequently, governments have increasingly placed bans on landfills thus making landfill-bound waste more expensive.

Many municipalities and other civic authorities have introduced recycling programs to varying degrees. Waste items can be manually categorized and assigned to different receptacles for disposal according to their category.

However, currently available commercial technology does not fully provide a dynamic and automated approach to visually sorting the waste items in an individual's hands and nudge them into sorting physically into the appropriate waste receptacles. Generally, systems rely on the users/public to identify an appropriate waste category for each item according to the local municipal recycling regulations and dispose of items accordingly. This is a highly cumbersome and ineffective process that battles public apathy as well as confusion as recycling guidelines are regularly updated, often legislatively with a promotional lag. For example, a user may be confused by labels on bins or items that are extremely simplified and do not provide recycling directions. Additionally, current recycling methods and categorization might not be intuitive. Users may not be able or willing to dispose of items in a manner desired by a local municipality or other authority. Recycling labels attempt to modify user behaviour without incentivising and engaging the user.

Measuring a facility's diversion or recycling efficiency can involve a manual waste audit. This localized method involves manual inspection of selected bins within a facility to estimate diversion rates of the facility. This method can be misleading, expensive, and time consuming because it only gives a mapped snapshot of a facility's waste intake for one single day. This method can require extrapolating any given days' worth of recycling to the entire year's waste patterns. The accuracy of such a prediction is extremely low and ineffective in judging a property's waste data.

The audit method might not be used to estimate diversion rates unless there is an assumption that all waste items are being correctly disposed of; for example, that all items in a recyclable bin are in fact recyclable. This might not be the case. For example, a coffee cup includes three items that belong in three distinct waste streams and thus should be sorted accordingly instead of dumped into a single container.

Waste audits by sorting bins might not be accurate due to the fact that each individual sorting bin might have an isolated data set of waste items that was disposed within that particular bin. The datasets do not have to be isolated in a bin scenario, they can be pushed onto multiple bins all across different locations if required via over the air updates. A drawback with these however is that they do not educate the public, they are hardware heavy and hence not easy to implement at large scales which ultimately do not help with reducing contamination levels at a higher level.

Embodiments described herein can enable real time waste auditing, computing metrics for prediction of fill levels using computer vision and machine learning of public facing waste receptacles using hardware and/or software, such as sensor(s). Embodiments described herein can attempt to increase diversion rates within a facility and actively educates the public with feedback in order to create a more intuitive recycling approach.

SUMMARY

In accordance with an aspect, there is provided a system for waste item detection. The system has sensors for detecting an approaching object to trigger a camera to capture image data and one or more processors to process the image data, wherein the sensors detect the approaching object by computing a continuous decrease in signal range for the approaching object. The system has a camera for capturing image data of the approaching object. The system has non-transitory computer readable storage medium with executable instructions for causing the one or more processors to: process the image data using a neural network to detect a waste item within the image data and determine a category for the waste item, wherein the neural network defines classes for different waste items and maps the detected waste item to the classes for the different waste items to compute a pairing of the detected waste item and a class, the class being associated with the category for the waste item; generate feedback data indicating the category for the waste item and an indication of an appropriate receptacle to dispose of the detected waste item. The system has a display device for displaying the feedback data.

In some embodiments, the processor is configured to use the neural network estimate a location of a head of the object within the image data and detect the waste item in the image data using the estimated location of the head within the image data.

In some embodiments, the neural network is trained using image data to define data points for person features, waste items, background and environment.

In some embodiments, the processor is configured to use the neural network to detect data points within the image data, the data points corresponding to a set of the person features, the set of the person features defining head features for estimating the location of the head of the object.

In some embodiments, a portion of the data points corresponding to the background and the environment for filtering the image data to focus on the detected waste item.

In some embodiments, the processor is configured to use the neural network estimate a location of hands within the image data based on the location of the head and detect the waste item in the image data using the estimated location of the hands within the image data.

In some embodiments, the feedback data indicates the location of the appropriate receptacle to dispose of the detected waste item.

In some embodiments, the neural network is trained through consecutive object detection to determine a correct receptacle that the waste item should be disposed.

In some embodiments, the camera and the sensors capture additional data indicating disposal of the waste item, wherein the processor determines an appropriate receptacle to dispose of the detected waste item, uses the additional data to determine whether the waste item was disposed in the appropriate receptacle, and generates additional feedback data based on the determination, the processor configured to measure closeness of a user to the appropriate receptacle.

In some embodiments, the camera captures additional image data indicating disposal of the waste item, wherein the processor determines an appropriate receptacle to dispose of the detected waste item, uses the additional image data to determine whether the waste item was disposed in the appropriate receptacle, and generates additional feedback data based on the determination.

In some embodiments, the display device displays the additional feedback data.

In some embodiments, upon determining that the waste item was disposed in the appropriate receptacle, the processor generates a reward for redemption as the additional feedback.

In some embodiments, the processor is configured to use the neural network estimate a location of hands within the image data and detect the waste item in the image data using the estimated location of the hands within the image data.

In some embodiments, the neural network is trained using image data to define data points for person features, waste items, background and environment.

In some embodiments, the processor is configured to use the neural network to detect person features within the image data, the person features defining hand features for estimating the location of the hands.

In some embodiments, the processor is configured to use the neural network to detect person features within the image data, the person features defining head features for estimating the location of the hands.

In some embodiments, the processor is configured to use the neural network to detect regions of the image data as background and environment and filter the regions of the image data to focus on the waste item in the image data.

In some embodiments, the processor is configured to detect head data within the image data and blur the head data to generate sanitized image data.

In some embodiments, the neural network is trained using image data to define data points for person features, wherein the person features define head features for detecting the head data within the image data.

In some embodiments, the processor is configured to tag the image data with metadata indicating a system identifier, category for the waste item, location data, and time data.

In some embodiments, a cloud server is configured to receive the image data tagged with metadata indicating the category for the waste item.

In some embodiments, the cloud server is configured to process the image data to detect head data within the image data and blur the head data to generate sanitized image data.

In some embodiments, a cloud server is configured to receive the image data tagged with metadata indicating the category for the waste item, validate the image data, generate a firmware upgrade for the neural network, and transmit the firmware upgrade to the processor to update the neural network.

In some embodiments, the processor is configured to compute image analytic data including types of waste items, volume of individual waste item, monitored volume of each receptacle based on the waste items disposed, and calculated diversion rate.

In accordance with an aspect, there is provided a system for waste item detection. The system has sensors for detecting an approaching object to trigger image processing for detection and recognition. The system has a camera for capturing image data of the approaching object. The system as non-transitory computer readable storage medium with executable instructions for causing one or more processors to: process the image data using a neural network to detect a waste item within the image data and determine a category for the waste item; generate feedback data indicating the category for the waste item; and a display device for displaying the feedback data.

In some embodiments, the feedback data indicates an appropriate receptacle to dispose of the detected waste item.

In some embodiments, the neural network is trained through consecutive object detection to determine where the waste items should be disposed.

In some embodiments, the camera captures additional image data indicating disposal of the waste item, wherein the processor determines an appropriate receptacle to dispose of the detected waste item, uses the additional image data to determine whether the waste item was disposed in the appropriate receptacle, and generates additional feedback data based on the determination.

In some embodiments, the display device displays the additional feedback data.

In some embodiments, upon determining that the waste item was disposed in the appropriate receptacle, the processor generates a reward for redemption as the additional feedback.

In some embodiments, the processor is configured to estimate a location of hands within the image data and distinguish the waste item in the hands within the image data.

In some embodiments, the processor is configured to detect head data within the image data and blur the head data to generate sanitized image data.

In some embodiments, the system has a cloud server configured to receive the image data tagged with metadata indicating the category for the waste item and process the image data to detect head data within the image data and blur the head data to generate sanitized image data.

In some embodiments, the system has a cloud server configured to receive the image data tagged with metadata indicating the category for the waste item, validate the image data, generate a firmware upgrade for the neural network, and transmit the firmware upgrade to the processor to update the neural network.

In some embodiments, the processor is configured to compute image analytic data including types of waste items, volume of individual waste item, monitored volume of each receptacle based on the waste items disposed, and calculated diversion rate.

In accordance with an aspect, there is provided a system for waste item detection. The system has a non-transitory computer readable storage medium with executable instructions for causing one or more processors to: process image data using a neural network to detect a waste item within the image data and determine a category for the waste item, the image data captured by a camera triggered by a sensors detecting an approaching object; generate feedback data indicating the category for the waste item; and a cloud server configured to receive the image data tagged with metadata indicating the category for the waste item and compute image analytic data using the image data and metadata; an interface for a display device for displaying the image analytic data.

In some embodiments, the processor is configured to detect head data within the image data and blur the head data to generate sanitized image data.

In some embodiments, the system has a cloud server configured to receive the image data tagged with metadata indicating the category for the waste item and process the image data to detect head data within the image data and blur the head data to generate sanitized image data.

In accordance with an aspect, there is provided a system for waste item detection. The system has sensors for detecting an approaching object to trigger image processing for detection and recognition; a camera for capturing image data of the approaching object; non-transitory computer readable storage medium with executable instructions for causing one or more processors to: process the image data using a neural network to detect a waste item within the image data and determine a category for the waste item; generate feedback data indicating the category for the waste item; and transmit the feedback data to a display device for displaying the feedback data.

In some embodiments, the feedback data indicates an appropriate receptacle to dispose of the detected waste item.

In some embodiments, the neural network is trained through consecutive object detection to determine where the waste items should be disposed.

In some embodiments, the camera captures additional image data indicating disposal of the waste item, wherein the processor determines an appropriate receptacle to dispose of the detected waste item, uses the additional image data to determine whether the waste item was disposed in the appropriate receptacle, and generates additional feedback data based on the determination.

In some embodiments, upon determining that the waste item was disposed in the appropriate receptacle, the processor generates a reward for redemption as the additional feedback.

In some embodiments, the processor is configured to estimate a location of hands within the image data and distinguish the waste item in the hands within the image data.

In some embodiments, the system has a cloud server configured to receive the image data tagged with metadata indicating the category for the waste item, validate the image data, generate a firmware upgrade for the neural network, and transmit the firmware upgrade to the processor to update the neural network.

In some embodiments, the processor is configured to compute image analytic data including types of waste items, volume of individual waste item, monitored volume of each receptacle based on the waste items disposed, and calculated diversion rate.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Like reference numerals can indicate like or corresponding elements in the drawings.

DETAILED DESCRIPTION

Embodiments of methods, systems, and apparatus are described through reference to the drawings.

Embodiments described herein relate to artificial intelligence, and more particularly to a waste item recognition and recycling education system utilizes machine learning and computer vision to detect waste items and nudge users into disposing them into the correct receptacle. The system uses hardware and software for waste item detection and recognition and can include an education or feedback system. The system uses machine learning and computer vision to detect waste items and generate feedback to nudge the user to dispose the waste items into appropriate receptacles while generating smart operational insights of a designated premise.

Embodiments described herein relate to hardware and software for embedding artificial intelligence systems that utilize machine learning and computer vision to attempt to increase waste diversion rates. The aforementioned system is an innovation in facility operational efficiency and property waste management. Generating smart insights of the waste intake within a premise allows for optimal understanding of the waste patterns and consequent corrective actions by management.

Embodiments described herein can provide an artificial intelligence driven waste recognition and recycling education system with object detection and recognition. The system can have a screen displaying feedback indicating the appropriate receptacle for the user to dispose the detected waste item.

Embodiments described herein can provide an artificial intelligence driven waste recognition and recycling education system. The system can have a hardware and software module with sensors to detect approaching users and trigger a vision system for object detection and recognition. The system can have a camera to capture images of the waste item for an event. The system can be an embedded system which runs a prediction engine (e.g. deep learning process) that detects the waste item and that can train itself through consecutive object detection to determine where the waste items should be disposed. The system can have a screen to dynamically provide feedback to nudge the user by either educating about correctly recycling the waste item in their hand, rewarding as they recycle properly or real time notifying when users have disposed the waste item incorrectly using object tracking.

Figure 1:
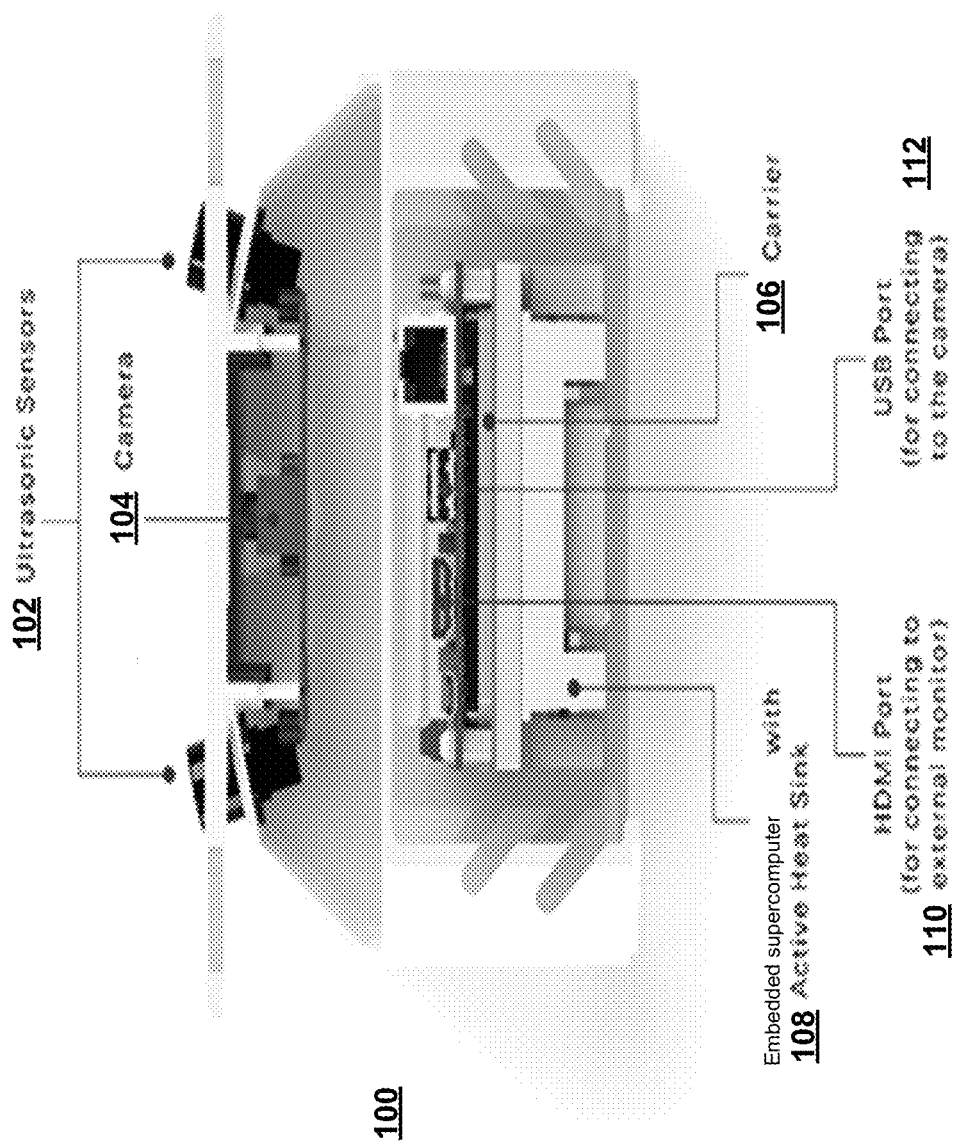
FIG. 1 is a top-down cross section view of a module according to an embodiment.

FIG. 1 is a top-down cross section view of a system 100 for waste item detection according to an embodiment. The system has a camera 104 for capturing image data of waste items. The system 100 has two ultrasonic sensors 102 (in this example) that can trigger the camera 104 and the vision components to process the captured image data when it detects an object (a person) in its array that is approaching a waste bin. The image data can be captured for an event. The event can be defined from the trigger (start) event to an end event (e.g. the person is walking away, the item is disposed of). The event can be linked to an event identifier for example. There may be more or fewer sensors 102 in other example embodiments. The vision components can be trained to focus on items in the hands of the approaching person for further waste item recognition. Accordingly, a set of image data can be defined as an "event" by the system 100. An event can be defined as all the data collected from the time a user enters into a pre-defined distance range from the system 100 to the time the user exits this distance range. The distance can be calculated using ultrasonic sensors 102 (or alternatively LiDAR or other distance processes). The event includes all the frames (or images) captured in this event bracket irrespective of the presence of a waste item in the user's hand (empty event).

The image data can be tagged with metadata, such as location identifier, system identifier, data/time, and so on. This metadata can be used by system 100 and/or a cloud server to generate analytic data and aggregate image data using metadata. The image data can be accompanied by logs or metadata. This can include the following example details: image name, location of image collected (system number and geographical location of system 100), date/time when image frame was captured, any predictions made on the image, distance values for the accompanied ultrasonic sensors, and so on. In some embodiments, the image capture process can add the above mentioned information in the image metadata. Additionally, any other image related information that can be useful in generating inferences and trends of interest can be defined as configurations for collection and can be added to the image metadata.

The sensors 102 can trigger the workflow for image processing using a proximity threshold, for example. The sensors 102 can distinguish between someone walking by, stopping to use a waste bin, and so on. The sensors 102 trigger can be directed by a continuous increase in proximity. An example current proximity threshold is 5 metres but this is just an example. There can be a larger range by stronger ultrasonic sensors 102, for example. There can be a smaller range in other examples.

The system 100 can be trained to detect a continuous decrease in the ultrasonic (or sensor) range as a trigger for predicting the waste item to be disposed. For instance, if after a few pulses by the ultrasonic sensors, it is determined that the range has continuously decreased by aggressive margins (e.g. greater than 50 cm/sec), then the predictive engine starts to analyze the images captured by the camera 104. Outliers of this scenario include non-users who diagonally walk across the device without disposing waste items, for example. If the ultrasonic range has decreased but stays the same then the system 100 detects that a user is passing by parallel to the device.

The system 100 has the ability to recognize waste items from a distance, this makes anyone with a waste item within the systems 100 (e.g. sensors 102, camera 104) field of view a user. In the specific case wherein a user is diagonally walking across the device without disposing the waste items, the system 100 might not want to filter out the frames and still recognize the waste items being carried across. This information can be valuable for the purposes of training and understanding consumption trends for the particular location.

The continuous decrease metric (using the ultrasonic sensors 102) can be computed by system 100 by aggregating the frame by frame delta in the distance readings over 'n' frame pairs, where 'n' is an integer and a configured number of frames based on the facility wherein the system 100 is installed. In other words, if there is a constant decrease in any one of the ultrasonic readings for 'n×2' constant frames, then a user/object is deemed to be approaching the system 100 in some examples.

The system 100 can be defined by a casing formed from a front panel, skeletal frame, and a rear panel to create an enclosure. In an example embodiment, the casing can appear to be a rectangular shaped object from the frontal view but is a complex mix of contours. In addition to containing the two ultrasonic sensors 102 and a camera 104, the casing is used to enclose the embedded hardware components (e.g. embedded supercomputer 108 with active heat sink, carrier 106) that operate to provide a neural prediction engine for waste item detection and recognition. The encasing can be equipped with waterproof and scratchproof features. This can allow it to be durable through rigorous janitorial operations, increased physical interaction with object-curious children, and/or vandalism, for example.

The system 100 can also have an HDMI port 110 (for connecting to an external display device or monitor). The system 100 can also have a USB port 112 for connecting to the camera 104. An example embodiment encloses the following components: Logitech C920 camera; Ultrasonic MB1010 sensors; NVIDIA Jetson TX2 with an active heat sink; Orbitty Carrier; USB Connector Hubs. This is an example.

Figure 4:
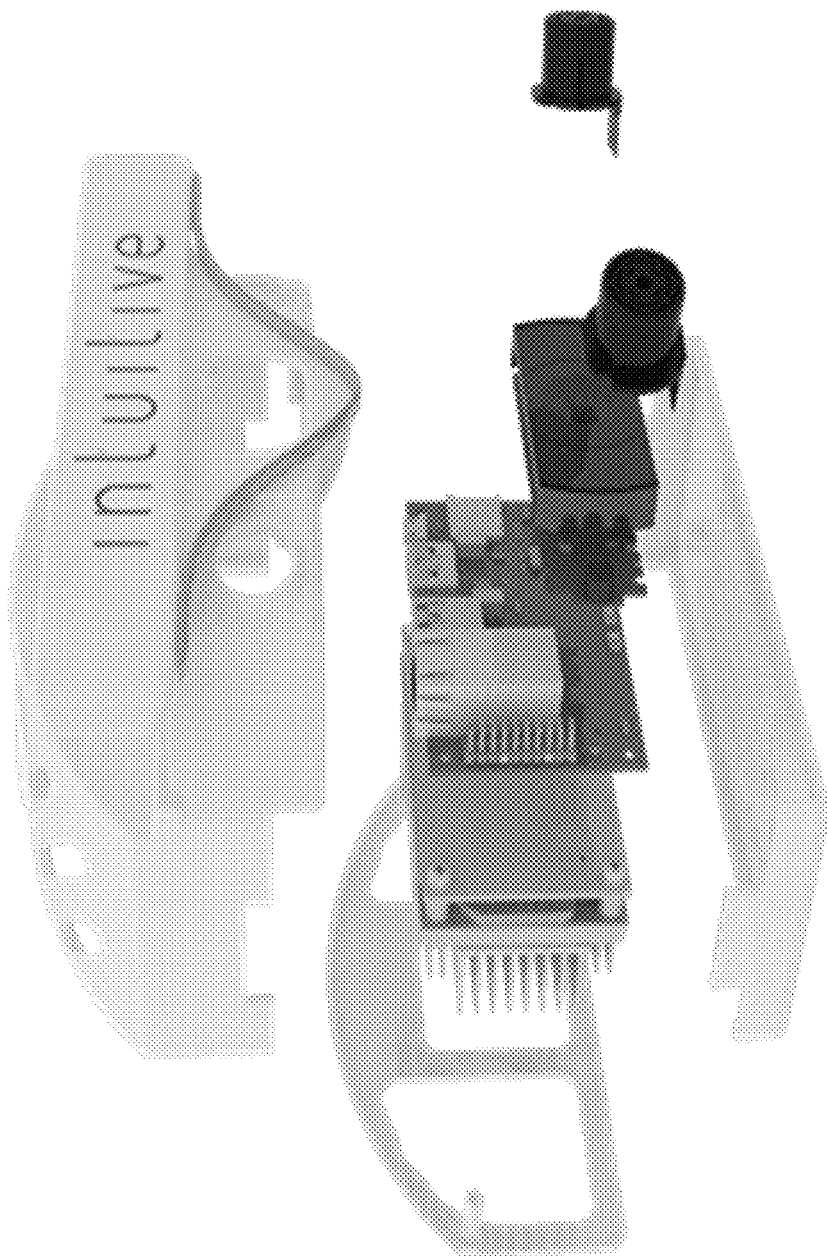
FIG. 4 is an exploded view of the module of FIG. 1.
Figure 5:
FIG. 5 is open state view of the module of FIG. 1.

FIG. 4 is an exploded view of the system 100 of FIG. 1. FIG. 5 is open state view of the system of FIG. 1.

The camera 104 can be placed equidistant from the two ultrasonic sensors 102. In this example, the aggregate field of view of the two sensors cover 110-150° range and the camera's field of view is 78°. The system 100 can have different positions or alternative configurations for the camera 104 and ultrasonic sensors 102. Alternative example configurations that would capture sufficient data include placing the camera 104 on top of the two sensors 102 or below them, forming either an upward pointing equilateral triangle, or downward pointing equilateral triangle.

The objective of the configuration is to obtain a sense of body movements of approaching users which can be accomplished via machine learning processes (and neural networks). The system 100 uses a neural prediction engine to analyse approaching body postures by scanning multiple frames and determine if a user is approaching.

An alternative to gain a similar objective would be to implement an optical flow that would be capable of determining the depth and distance of every pixel within an image by feeding the system 100 a data set of images recorded by a depth sensor. Another alternative method would be to use LIDAR system. A LIDAR system is able to send out and receive millions of pulses and compute hundreds of revolutions per second, building up a very accurate three dimensional map of its environment. This is a dynamic process and any moving object is quickly identified due to the constant change in the time for the pulse to bounce back from the object's surface. A LiDAR attachment to the system 100 can either replace and/or complement the ultrasonic sensors 102 to compute distances of users moving towards/away from system 100 powered waste bins. This could increase the speed and accuracy with which a determination of user presence is made. Furthermore, the system 100 may be used to create and store three dimensional maps of the locations where systems 100 are installed to incorporate and provide indoor location intelligence as an additional service by studying location-wise workflows.

Figure 2:
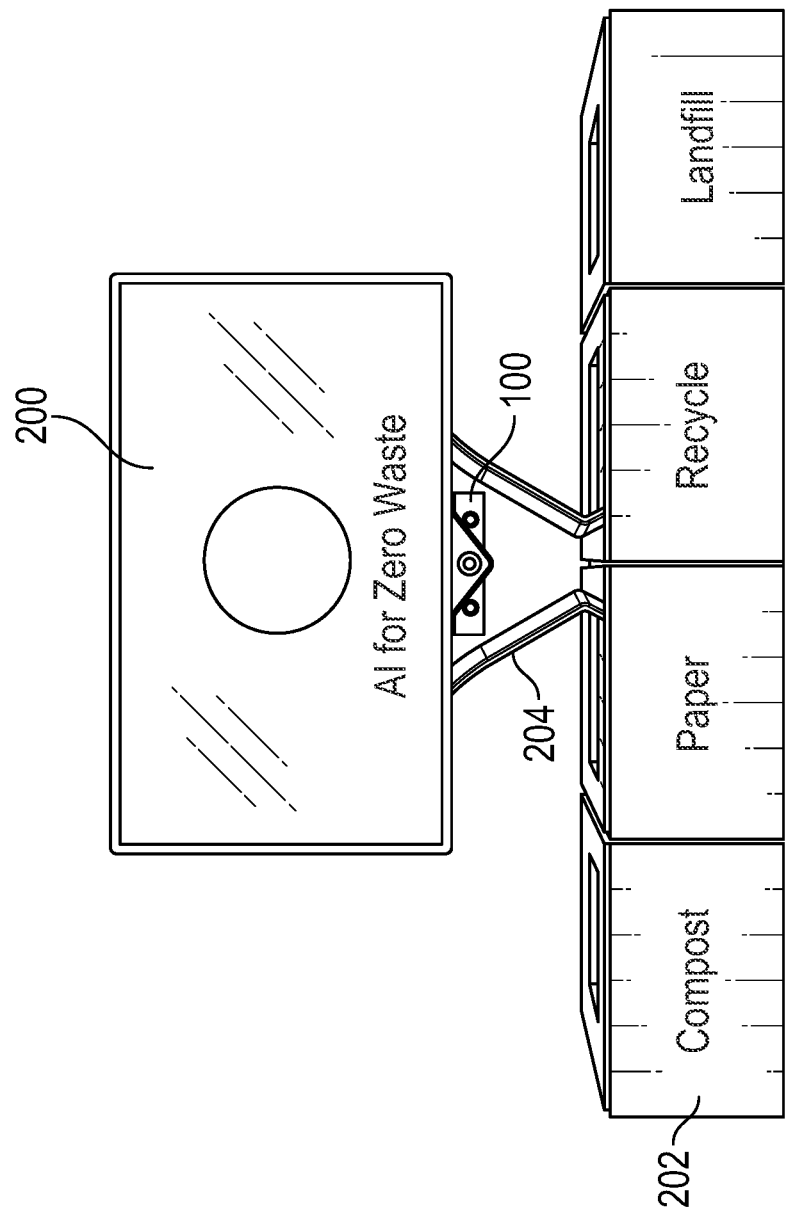
FIG. 2 is an overview of the placement of the module of FIG. 1.

FIG. 2 is an overview of the placement of the system 100 of FIG. 1. The system 100 can connect to a display device 200 and can connect to a waste bin 202 (with a plurality of containers such as, compost, paper, recycle, landfill) by a connector 204. The external display device 200 or screen can include an audio/visual display to dynamically provide audio/visual feedback nudge users into dispose the waste items into a correct container of the waste bin 202. Example feedback includes but is not limited to: instructions for interacting with the system 100 and (container of) bin 202, reactive notifications of correct or incorrect disposals of waste items into containers of bin 202, information on the local categorizations (that map to containers of bin 202), rewards for accurate recycling, general advertising, and so on.

There can be a user profile and/or customer profile that maps to a set of systems 100 (e.g. a city user that manages 20 systems, each system 100 identified by a system identifier and linked to the profile of the city user). This can enable the cloud server to generate analytics specific to a user or benchmark data specific to a user, system 100, and so on. In some embodiments, there can be a mapping for the user profile. This mapping can be done on two levels: the user and the customer (e.g. airports).

On an individual user level, the system 100 can recognize key characteristics of people prior to sanitization and storing, for example: age range, and modify the feedback (animations/messaging) to make it more appropriate for the user. In this example, the nudging process can have speed of (feedback) playback embedded within it as a variable, slowing down for an elderly user allowing for a longer and more relaxed feedback nudging approach to ensure the user is comfortable with following the sorting process, while making the feedback more colourful and child friendly for a user who is a kid. These changes can be embedded in the animation/nudging display algorithm and can adjust dynamically based on who the individual user is.

On a customer level, a cloud server can generate visual elements for a dashboard interface to visualize all the systems 100 deployed at a facility (ex: an airport) or geographic area, for example, as nodes on a map in a cluster that share similar attributes. For this example, the airport system 100 can have features optimized for a "traveller" user profile, accommodating the typical characteristics of users that might be found on an airport—for instance a language agnostic feedback nudging/animation design to ensure that there is no language barrier impeding accurate recycling as an airport can have users from all around the world. Similar "customer level user profiles" can be created for other types of customers such as but not limited to office building, malls, universities, cities, etc. based on generalized demographic-based characteristics found at these specific locations.

The feedback data can indicate a reward for a user based on a correct disposal of the waste item, for example. For example, feedback data for a reward can include a QR code (or other machine readable indicia) display on device 200. A user can use their mobile device to scan the QR code shown on the screen which can direct their device to a "Thank you" page, wherein the user inputs their name and email address, creating a profile for the specific user allowing repeatability (user will only enter their name the following time). In some embodiments, system 100 can be configured for associating faces of users with their rewards profile. The system 100 can recognize and store the faces of users (if they consent to participate in the rewards program) in a separate and secure rewards database, and would query this database every time a rewards-enabled user disposes an item making the process seamless. Once registered, the user can walk up to any of the system 100 placed at any location and dispose the waste items as shown on display 200. The system 100 would automatically recognize the user as a registered rewards member and assign points accordingly. The user can see the status of their points at any time and can claim them with any one of our sponsoring partners as they please.

There can be a calibration process for the display 200 to align the visual indicators with the containers of the bin 202 so that the system 100 can adapt to different bin types, configurations of containers, and so on. The calibration process for the display 200 can be implemented when the waste bins are visual or not visible via the camera 104. This can be done by analyzing the last predicted frame of a disposal event and locating the centroid of the waste item. By calculating the shortest Euclidean distance, the system 100 can determine feedback data and display (on device 200) the feedback data as visual indicators to the appropriate container of the bin 200.

The system 100 can be attached to the display device 200 which can generally be placed above receptacles or containers of a bin 202 for object detection. The bin 202 shown is an example four waste stream process but the system 100 is independent of number of waste streams that can be placed below and arranged as the bin 202. The system 100 has vision components that are triggered by the two ultrasonic sensors 102 to commence the data flow and processing. The vision components capture image data enabled by the camera 104 and processes the image data to identify the object (or objects) approaching the system 100. The camera 104 has a field of view that can capture image data depicting a waste item and a person carrying the waste item, for example.

The system 100 includes a supercomputer 108 (and carrier 106) that processes the image data to detect a general shape of the person to estimate the location of the hands within the body. The supercomputer 108 processes the image data to further distinguish the waste item in the hands of the approaching user. The supercomputer 108 can configure convolutional neural networks (stored in data store) and train the convolutional neural networks (CNN) to identify the waste item and recognize its destination among the different waste categories. In some embodiments, the supercomputer (embedded system) 108 runs inference for the neural networks deployed on it. A cloud server can train CNNs for the supercomputer 108, for example. The CN Ns are trained on the backend cloud server using deep learning process and the trained models can be deployed onto the embedded systems on the bins with the supercomputer 108. Hence, in some embodiments, the embedded systems only run inferences on networks that have been trained elsewhere (cloud server). Inference refers to confidence levels of predicting the items in frames based on the training datasets. In some embodiments, training of the CNNs can be implemented on the embedded system (supercomputer 108).

The system 100 can predict or estimate that the item in the hands is a waste item. For example, when the face is detected, the area or region below the face is where the system 100 assumes the waste item will be held. In some embodiments, it is not expected that the waste item will be held above the human torso. The system 100 can use a neural predictive engine trained for different types of objects (not limited to waste items) such cellphones and shopping bags. For such items, the system 100 might not run any predictions unless the user is extremely close to the device and is actively presenting the item to be identified.

The CNN can be trained not only with processing several images that have been tagged with the correct category, but also via augmentations of waste item disposal event images. The system 100 (and/or cloud server 160 of FIGS. 6 and 7) can augment images so that it can recreate different settings, e.g. various light and contrast conditions, image blurriness, etc. The system 100 can also use a generative adversarial network that develops complex backgrounds. This can increase the pace in accuracy and overall training of the neural prediction engine. After capturing an image, the CNN can detect a face and immediately focus on the area below it and around the torso. An identifiable object (e.g. similar looking waste items) can then be detected as the waste item to be disposed. Other data points in the image can be filtered to focus on the item in question.

Figure 8:
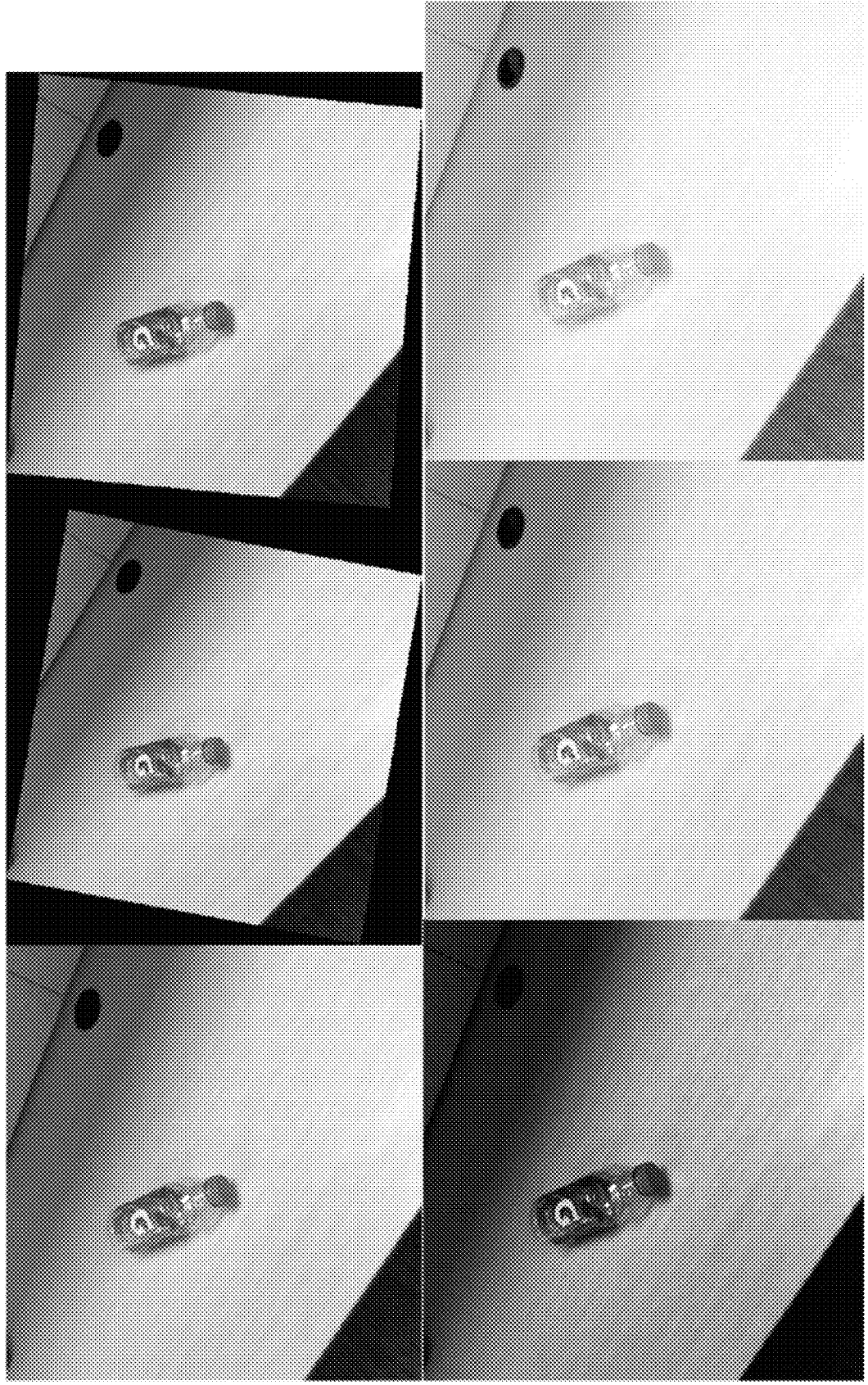
FIG. 8 depicts examples of augmented images.

Augmentations can refer to synthetic changes in original images within the dataset to diversify and strengthen the overall dataset. The more diverse the training data, the more ready the trained network will be for input situations (images) presented to it in various scenarios. FIG. 8 is an example of a bottle image (first image is the original), that has been augmented to rotate by 5 degrees, 10 degrees and through a range of gamma values to allow for brightness diversity.

The supercomputer 108 generates feedback data based on the detected category (or categories). The display device 200 can then display the feedback indicating predicted items and guide the user to throw or separate items in the correct receptacles or containers of the bin 202. For items outside the standard waste stream categories, the system 100 can provide feedback for sustainability and due process. For instance, if batteries were detected and then the user would be nudged to dispose them in the landfill, and a notification to the janitorial staff will be sent to empty out the hazardous item.

An accurate disposal in the appropriate receptacle can be recognized by the system 100 using object tracking. The user can be notified (at display device 200 with additional feedback and provided with a reward (such as a coupon) that could be attained via different ways such as scanning a QR code for redemption at a store, for example.

For example, based on the movement of the user, the ultrasonic sensors 102 can detect if the item is placed in the correct receptacle of the bin 202. A detected movement towards a receptacle that is not recommended by the system 100 can trigger the display device 200 to notify the user of the mistake and try to guide the user the correct recycling procedure using additional feedback. The intensity of the re-education can be customized by, for example, the property management who can have access to a dashboard 306. This notification may give the user a chance to rectify the inaccurate disposal of the waste item.

The movement of the user can be determined once the visual indicator is provided at display device 200 as the guide to ensure the user correctly disposes of the item. The camera 104 can capture the waste item in an image and the ultrasonic sensors 102 can measure the closeness of the user's body as the user is getting closer to the receptacles to dispose the waste item. In each frame the object's location relative to the receptacles can be calculated. The neural prediction engine can calculate the waste item's centroid and its distance from the recommended receptacle. As the waste item's centroid is closing its distance towards the any other receptacle other than the recommended receptacle, the system 100 can inform the user that the disposal is incorrect.

Figure 3:
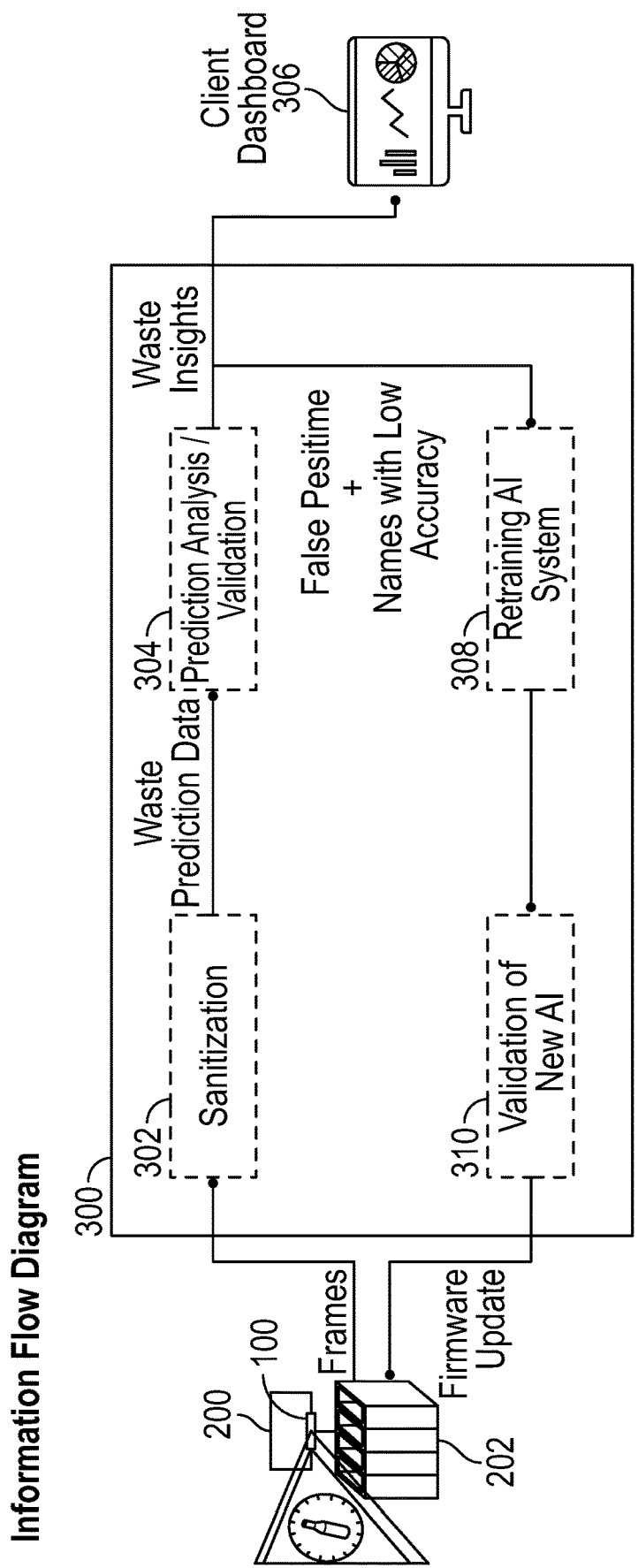
FIG. 3 is an information flow diagram of the waste diversion system process according to an embodiment

FIG. 3 is an information flow diagram of a process 300 for a waste diversion system process according to an embodiment. The system 100 has vision components that are triggered by the two ultrasonic sensors 102 to commence the data flow of the process 300.

Figure 6:
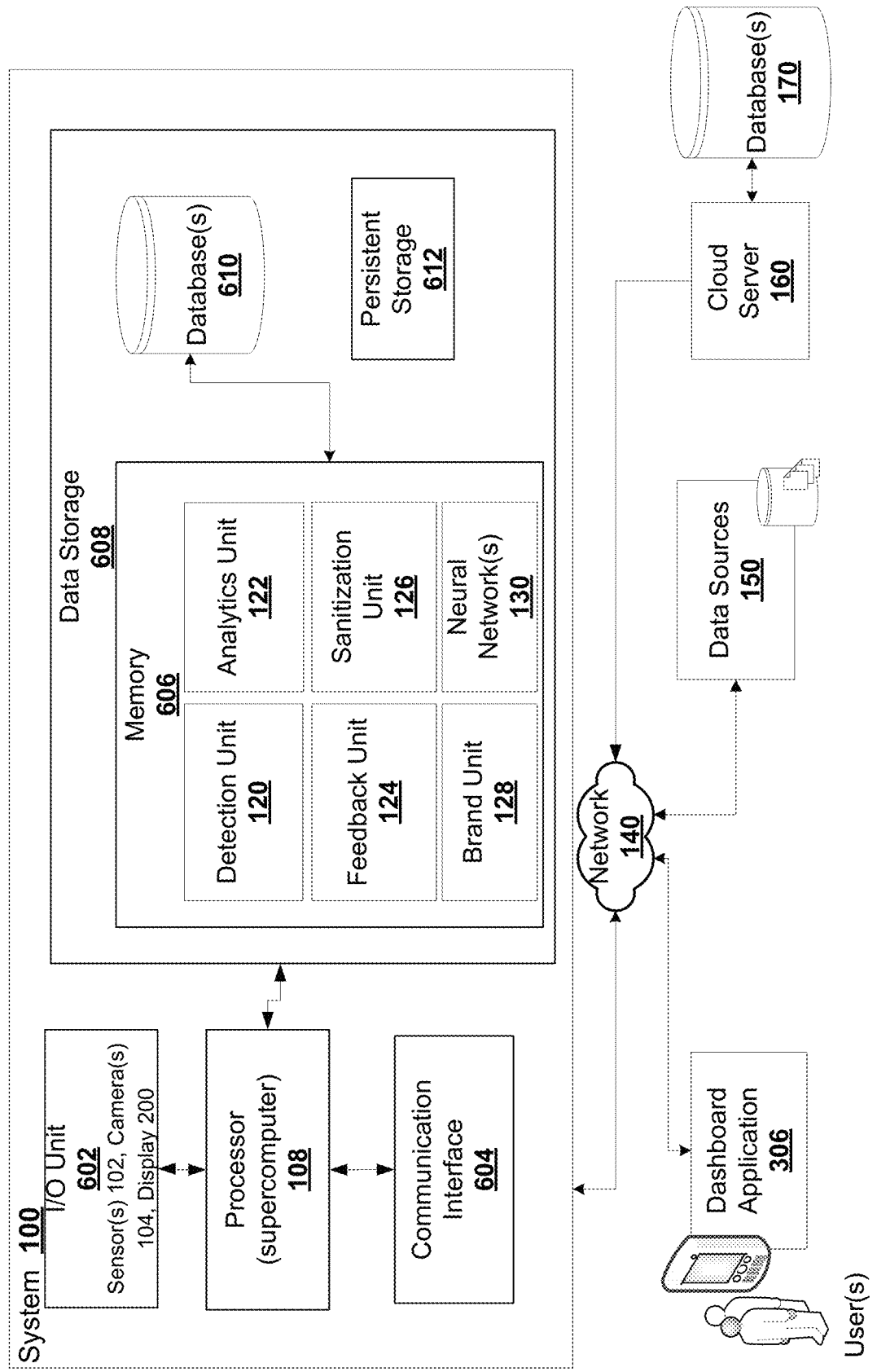
FIG. 6 is a diagram of a system for waste item detection and recognition according to some embodiments.
Figure 7:
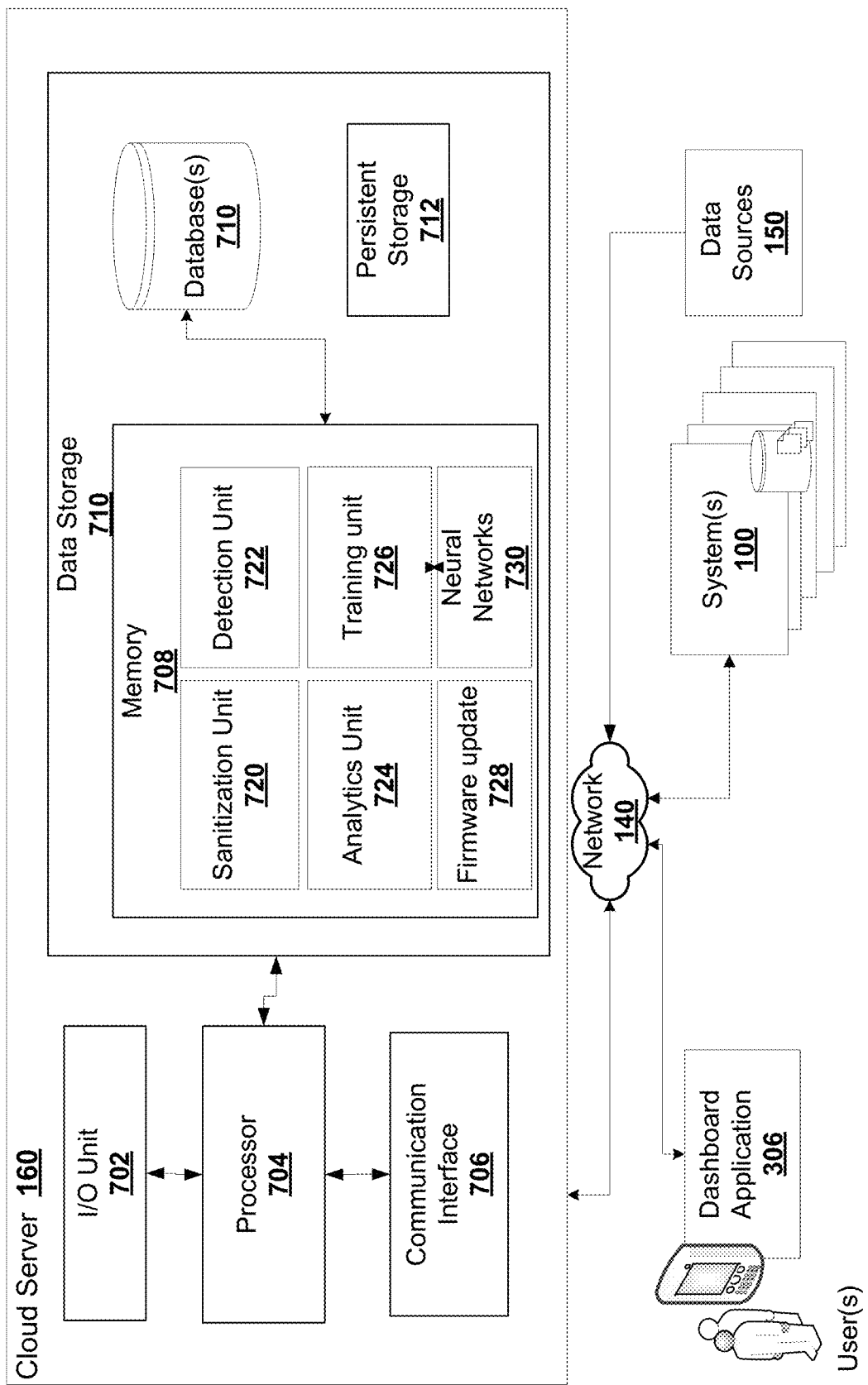
FIG. 7 is a diagram of a system for waste item detection and recognition according to some embodiments.

The process 300 indicates activation of a neural predictive engine for operation of the system 100 and continual learning/updating of the system 100. Aspects of the process 300 and engine can be implemented at a cloud server 160 (FIGS. 6 and 7). In some embodiments, the process 300 can be implemented (or portions thereof) on a backend server connected to system 100. In some embodiments, the process 300 can be implemented (or portions thereof) on the system 100. The backend server can be connected to a network of systems 100 to collect and process image data from multiple systems 100.

At 302, the process of sanitization begins when the engine receives the frames (image data) captured by the camera 104 to be processed for further image analysis. These images contain faces and sanitization can involve blurring the faces (instantaneously) as part of the waste item identification process in the neural prediction engine. In some embodiments, the system 100 can implement sanitization of the images to blur detected heads. The processed images of waste items can be transmitted to a cloud database and server for further sanitization, such as the blurring of missed faces in the previous stage. As noted, the process can be implemented at a backend server 160 or cloud database.

The blurring process is not only directed to faces but also any shape that is indicative of a person's head, such as the side profile of a face or the back of users' heads. This is to blur and block any personal identifiable information, for example. The system 100 (and/or cloud server 160) can make sure the detected heads in the background are sanitized from the image data as well while processing the focus on the user who has walked up to the bin to dispose of waste items.

The blurring process can detect data indicative of a person's head. There can be a training phase with person features to define head characteristics, for example. For example, the system 100 and/or cloud server 160 can develop a face network using face datasets, to get a baseline face network started. This model might be good enough to blur any frontal or profile face angles, allowing for an effective first sanitization run. Following this, all frames with heads (facing the camera at any angle) can be annotated and added to the existing face dataset making it more robust and inclusive of a head at all angles.

At 304, the waste prediction data (image data) can be processed to generate waste insight metrics. The waste insight metrics can be output for display as part of a dashboard interface 306. In some embodiments, there can be an added step of human validation that verifies the sanitized data which will then be inputted into the retraining of the engine. At 308, false positives and items with low accuracy can be verified and the data used for retraining of the system 100 (and engine). At 310, validation of the engine can result in the firmware updates to the system 100 which allows for a continually improved system 100. The system 100 includes an engine for detection of waste items which can be updated at 310 for continuous learning.

The system 100 can implement automated waste audits. As each system 100 detects waste items, the system 100 stores the type of items disposed into each waste stream. The system 100 can generate metadata or waste insight metrics to predict volume of each waste receptacle of the bin 202 based on the item disposed and to calculate diversion rates. The image data can be tagged with the computed metadata. In some embodiments, the metadata can be linked to an identifier linked to the image data. The system 100 transmits all collected metadata (along with the associated image data, or an identifier linked to the image data) to the cloud server to be accessed (near) instantaneously. The dashboard 306 can display computed data (e.g. metadata, insights) that tracks assigned systems 100 within any given premise. That is the dashboard 306 can display data for a set of systems 100. The dashboard enables property managers to view real time waste analytics for a system 100 or a set of systems 100. Furthermore, a waste audit report can be tabulated instantaneously due to the capabilities of the neural prediction engine and the computed waste insights.

In some embodiments, the system 100 can implement brand recognition and trigger the display of corresponding advertisements or reward on display device 200, for example. A sanitized waste item frame taken by the vision system 100 and stored in the cloud database at the cloud server may be further processed to extract useful information, such as brands indicated in the image data. For example, the cloud server can extract brand information from the image data and provide this information to third parties. The brand information can include data relating to the brands of the items being thrown away. This consumption dataset stored at could be passed on to other systems 100 as a way to retrain the artificial intelligence engine. The system 100 can provide feedback data to reward the user from the brand if a partnership is established, for example. An alternative is also the collection of brand data that could be used for advertising at display device 200.

FIG. 6 is a diagram of a system 100 for waste item detection and recognition depicting an example physical environment.

The system 100 can include an I/O Unit 602 (with sensors 102, camera(s) 104, display 200), a processor (supercomputer) 108, communication interface 604, memory 608, and data storage 608. The processor 108 can execute instructions in memory 606 to implement aspects of processes described herein. The processor 108 can execute instructions in memory 606 to configure detection unit 120, analytics unit 122, feedback unit 124, sanitization unit 126, brand unit 128, neural networks 130, and other functions described herein. The system 100 may be software (e.g., code segments compiled into machine code), hardware, embedded firmware, or a combination of software and hardware, according to various embodiments.

The system 100 is configured for artificial intelligence driven waste item recognition and recycling education. The system 100 has a module with two ultrasonic sensors 102 to trigger the vision components and a camera 104 (e.g. as part of an I/O Unit 602) to capture image data for provision to detection unit 120 to detect waste items. The module can connect to a connector for attachment to a bin 202 and/or display device 200. The feedback unit 124 can generate feedback based on the processed image data. The display device 200 (e.g. as part of an I/O Unit 602) has a screen to display identified waste items and feedback to nudge users to dispose them in the appropriate waste receptacle. For example, the feedback can indicate the correct receptacle of the bin 202.

The detection unit 120 includes a neural prediction engine which utilizes machine learning (and neural networks 130) to recognise waste items and map the waste items to a category based on a list of classes for different waste items. Through each image that is being processed by the detection unit 120, the following example data points can picked up: person features, objects, environment. Example person features include the method of holding a waste item, the hands of the users, and so on. Example object data includes pairing of different waste items. Example environment data includes background elements, lighting of objects and users. The training data points for the person features, objects, environment can then transformed into classifiers or class definitions for real-time detection. For example, this can involve adding a "person" class to the training dataset, which can be annotated with frames wherein persons are present. The persons, objects and environments can be part of the dataset used for training the neural network. During training, the network computes features from data points to learn unique attributes about each of these classes. Once the training is complete the network has learnt to classify different objects, environments and the features of persons or any combinations of these uses the trained classes.

Figure 9:
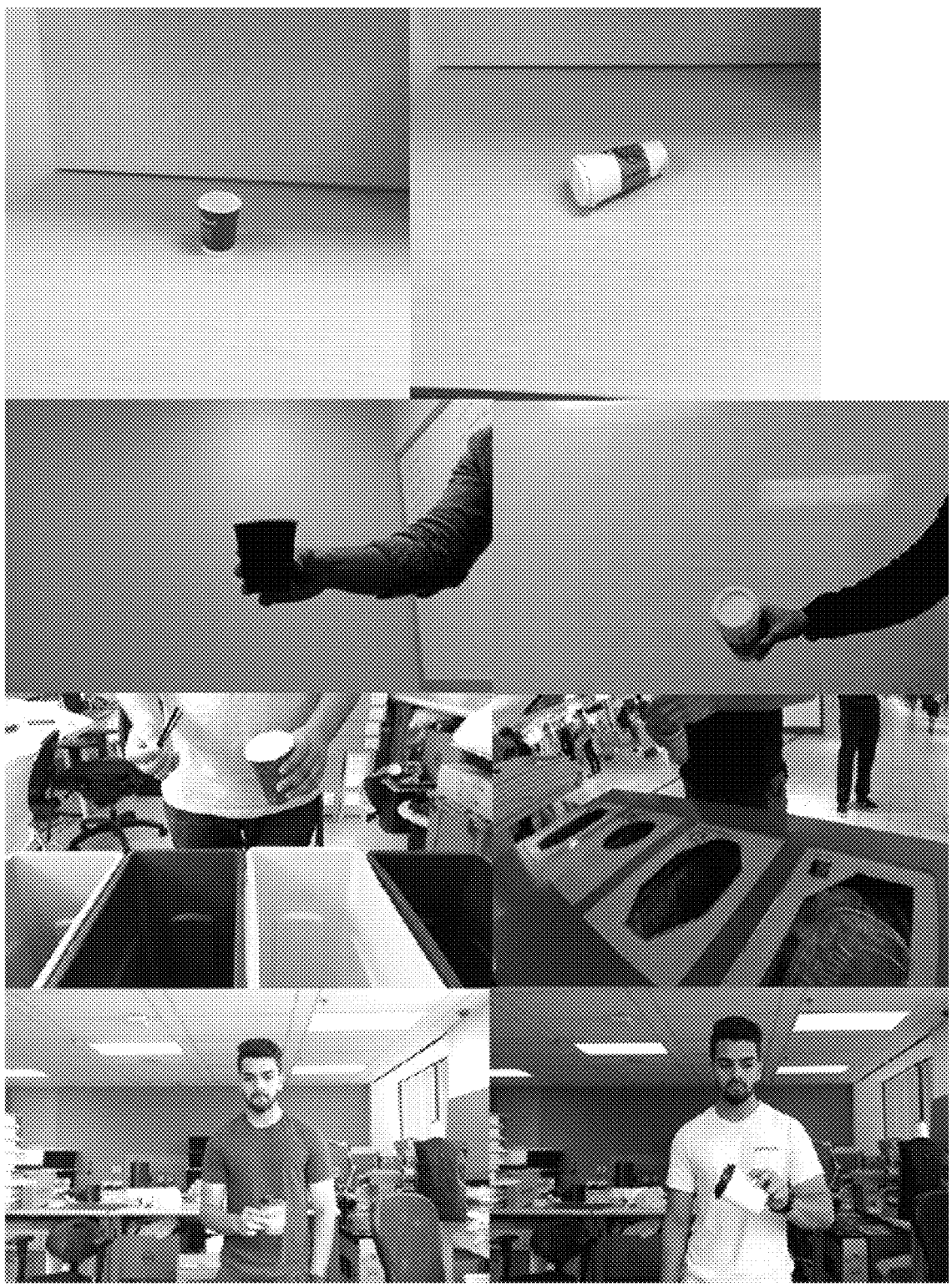
FIG. 9 depicts example images of a class of waste item.

FIG. 9 illustrates sample training images for the class "coffee cup". The dataset (for class coffee cup) can have thousands of images like these examples (and augmentations of these images). The dataset includes a wide variety of coffee cups displayed with different backgrounds and angles.

Each waste item has a uniquely assigned class or definition so that the detection unit 120 can classify the detected item in the image data. Each waste item has its own training class. Fundamentally, each class has a certain number of training images and the neural network 130 goes through a thousands of steps (iterations) traversing the dataset in batches to learn features about each image and associating them with the labelled classes (per image). Over thousands of steps, the network's 130 error function stabilizes meaning that it learns to generalize image inputs and make predictions about the classes they are most likely to be in. This means that for each image passed through the neural network 130 (e.g. shown to the network), there is an output confidence level referring to how confident the neural network is about its prediction for an image belonging to a certain class. The system 100 can set the confidence level to a confidence threshold and if the prediction confidence drops below the threshold, the image is flagged as unsure for validation. All flagged images are then re-annotated and retrained allowing for the network 130 to learn from its low confidence predictions and improve its overall accuracy. If the system 100 is unable to classify an image, it shows the user the most commonly disposed waste item in an area, allowing for probabilities in favour of the highest likelihoods based on past patterns.

The detected (and classified) waste items can be used by feedback unit 124 to provide feedback at display 200 to nudge users to dispose them accurately while simultaneously educating them. The detection unit 120 uses object detection that utilizes computer vision to identify a waste item and apply unique predictive processes. The categorized waste items is used by feedback unit 124 to generate feedback to nudge the users in disposing the waste accurately in the appropriate waste receptacle.

The detection unit 120 uses trained neural networks 130 to process the data pipeline. The analytics unit 122 can generate insights on validated waste predictive data or insights. The data can include but is not limited to: type of waste item; item disposed in waste stream; product brand of waste item; dimensions of waste item; volume of waste item; public engagement metrics; updated diversion rates of waste items; individual receptacle fill level.

The brand unit 128 can generate brand or advertisement data for display at device 200. This can include rewards, for example. For example in an application, Face detection triggers the immediate blurring and removes any personal identifiable information. After scanning a captured frame, detection unit 120 locates the waste item within the image. The brand unit 128 can apply a brand image classifier in real time to recognise any of the brand logos that it is previously trained to identify. Brand logos and their variations can be continuously updated on system 100 and linked to corresponding waste items.

As shown, the system 100 has sensors 102 for detecting an approaching object to trigger a camera 104 to capture image data and the processor 108 to process the image data. The sensors 102 detect the approaching object by computing a continuous decrease in signal range for the approaching object, for example. The system 100 uses the camera 104 for capturing image data of the approaching object. The system 100 has non-transitory computer readable storage medium with executable instructions for causing the processors 108 to use the detection unit 120 to process the image data using a neural network 130 to detect a waste item within the image data and determine a category for the waste item. The neural network 130 defines classes for different waste items and maps the detected waste item to the classes for the different waste items to compute a pairing of the detected waste item and a class. The class is associated with the category for the waste item. The category can map to a receptacle of the bin 202, for example. The feedback unit 124 generates feedback data indicating the category for the waste item and an indication of an appropriate receptacle (of the bin 202) to dispose of the detected waste item. The system 100 has a display device 200 for displaying the feedback data. In some embodiments, the feedback data indicates the location of the appropriate receptacle to dispose of the detected waste item. In some embodiments, the neural network is trained through consecutive object detection to determine a correct receptacle that the waste item should be disposed and this can map to the appropriate receptacle to dispose of the detected waste item.

In some embodiments, the detection unit 120 is configured to use the neural network 130 estimate a location of a head of the object within the image data. The detection unit 120 can detect the waste item in the image data using the estimated location of the head within the image data. For example, the head location can be used to determine or estimate hand location and the waste item is proximate to the hand location, for example. The waste item might be below the location of the head, for example.

In some embodiments, the neural network 130 is trained using image data to define data points for person features, waste items, background and environment. These features can be used to process real-time image data to determine regions of the image data the relate to person features such as hands, head, and so on. In some embodiments, detection unit 120 is configured to use the neural network 130 to detect data points within the image data. The data points can correspond to a set of the person features, the set of the person features defining head features for estimating the location of the head of the object. In some embodiments, a portion of the data points corresponding to the background and the environment which can be used filtering the image data to focus detection unit 120 on the detected waste item within the image data. In some embodiments, the detection unit 120 is configured to use the neural network 130 estimate a location of hands within the image data based on the location of the head and detect the waste item in the image data using the estimated location of the hands within the image data. In some embodiments, the processor 108 is configured to use the neural network 130 to detect person features within the image data, the person features defining hand features for estimating the location of the hands.

In some embodiments, the processor 108 is configured to use the neural network 130 to detect person features within the image data, the person features defining head features for estimating the location of the hands.

In some embodiments, the camera 104 and the sensors 102 capture additional data indicating disposal of the waste item. The processor 108 determines an appropriate receptacle to dispose of the detected waste item, uses the additional data to determine whether the waste item was disposed in the appropriate receptacle. The feedback unit 124 can generate additional feedback data based on the determination. The processor 108 is configured to measure closeness of a user to the appropriate receptacle using data from sensor 102 and/or camera 104, for example. In some embodiments, the camera 104 captures additional image data indicating disposal of the waste item. The processor 108 determines an appropriate receptacle to dispose of the detected waste item and uses the additional image data to determine whether the waste item was disposed in the appropriate receptacle. The processor 108 generates additional feedback data based on the determination. In some embodiments, the display device 200 displays the additional feedback data. In some embodiments, upon determining that the waste item was disposed in the appropriate receptacle, the processor 108 generates a reward for redemption as the additional feedback.

In some embodiments, the sanitization unit 126 is configured to detect head data within the image data and blur the head data to generate sanitized image data. The sanitization unit 126 can use the person features, for example. In some embodiments, the neural network 130 is trained using image data to define data points for person features. The person features define head features for detecting the head data within the image data. The sanitization unit 126 can use the neural network 130 for the blurring process.

In some embodiments, the processor 104 is configured to tag the image data with metadata indicating a system identifier, category for the waste item, location data, and time data. In some embodiments, a cloud server 160 is configured to receive the image data tagged with the metadata. The cloud server 160 can use the metadata to generate visual elements for dashboard 306. For example, cloud server 160 can use the location data to generate visual elements for dashboard 306 that relate to systems 100 at a specific location region. As another example, cloud server 160 can use the category data to generate visual elements for dashboard 306 that relate to disposal of waste items of a particular category across a network of systems 100. Other dynamic elements for dashboard 306 can be generated by cloud server 160.

In some embodiments, the cloud server 160 is configured to process the image data to detect head data within the image data and blur the head data to generate sanitized image data. That is, cloud server 160 can implement an additional sanitization process to ensure all head data is blurred. In some embodiments, the cloud server 160 is configured to receive the image data tagged with metadata indicating the category for the waste item, validate the image data, generate a firmware upgrade for the neural network 130, and transmit the firmware upgrade to the system 100 to update the neural network 130.

In some embodiments, the analytics unit 122 is configured to compute image analytic data including types of waste items, volume of individual waste item, monitored volume of each receptacle based on the waste items disposed, and calculated diversion rate. The following provides an example of how some metrics can be computed by analytics unit 122.

The analytics unit 122 can compute dimensions of waste items using a foundational dataset for dimensions of popular waste items (e.g. coffee cups, bottles, cans, plastic wrappings/bags). Combining this with the distance calculated of the waste item by ultrasonic sensors 102, the detection unit 120 (neural prediction engine) maps it across a predefined list to determine what dimensions corresponds to the given distance datapoints. Each captured frame is pixelated and each pixel is scaled for the given distance in that frame. The number of pixels it takes to form the waste item in the image is calculated and cross checked with the rest of the frames. For instance, at a distance of 50 cm from the camera, a medium sized coffee cup should occupy 40 pixels on the captured frame.

The analytics unit 122 can compute the volume of waste item using a foundational dataset for volumes of popular waste items (e.g. coffee cups, bottles, cans, plastic wrappings/bags). Combining this with the distance calculated of the waste item by ultrasonic sensors, the detection unit 120 (neural prediction engine) maps it across a predefined list to determine what volume corresponds to the given object at a specific distance.

The analytics unit 122 can compute public engagement metrics on different levels. An example level is for once the system is active (displaying visualizations on the screen of device 200), passerby impressions can be counted as gaze estimation (deep learning process) towards the receptacles. The analytics unit 122 can calculate the number of seconds the passerby is viewing the display screen by counting the number of consecutive frames gaze estimation algorithms. This might not include the disposal of waste items.

An example level is for once the event disposal takes place and the user is leaves without staying for the additional information displayed on the screen of device 200, including the QR codes for a myriad of rewards from brand partners. An example level is for once the user has stayed after disposing the waste item, scanned the displayed QR, and has been directed to the partner brand's website.

The analytics unit 122 can compute updated diversion rates of waste items once diversion rates will be updated at the end of each day, and can be calculated as follows:

$$\frac{\sum(\text{Volume of Organics Receptacle} + \text{Volume of Recyclable Receptacle} + \text{Volume of } X \text{ Waste Stream})}{\text{Volume of All Receptacles (includes landfill)}}$$

The analytics unit 122 can compute individual receptacle fill level metrics. As each item is identified, a record of the item's dimensions are stored and added onto the volume of the receptacle it was designated. The analytics unit 122 can build a set the volume of each receptacle. A confirmation of the item disposed in the correct receptacle acts as a cross-check of the volume of each receptacle.

The system 100 implements a process for providing feedback to nudge the user to dispose the waste item into a receptacle. The process can involve the detection unit 120 for detecting the waste item to generate an predictive model based on previous training. The detection unit can be configured to analyze the image using a neural network 130 to determine a category for the waste item. The feedback unit 124 can determine an appropriate receptacle for the waste item based on the category and generate feedback data that can trigger the display of a dynamic reaction (motion graphic) on the screen indicating to the user the appropriate receptacle for the waste item.

The feedback unit 124 can implement a process for rewarding a user based on accurate recycling by providing myriad ways such as scanning a QR code for redemption at a partner's location. This interaction with the system 100 provides an engagingly intuitive and positive recycling experience.

The system 100 uses sensors 102 to trigger a process for activating the vision system enabled by the camera 104 to identify the object approaching the bin 202 and module of the system 100. The system can estimate if the shape (e.g. human) approaching is predicted to dispose a waste item to trigger camera(s) 104 to capture video data. The detection unit 120 can process the image data to estimate the location of the hands within the shape and further distinguish the waste item in the hands of the approaching shape.

The system 100 can implement a training process (of neural networks 130) to enable detection unit 120 to focus on items in the hands of the video or image data. The training can be implemented at the cloud server 160, the system 100, or a combination thereof.

Through each image that is being processed by the system 100 (and detection unit 120), the following example data points can picked up: person features, objects, environment. Example person features include the method of holding a waste item, the hands of the users, and so on. Example object data includes pairing of different waste items. Example environment data includes background elements, lighting of objects and users.

Training images can be obtained by attaching recording sensors next to bins. After the images (data) are recorded, sanitizing can involve blurring of faces so that waste items become the focus of analysis. Annotating begins after bounding boxes are defined to indicate where the waste item would be located by running the sanitized images through a machine learning system that does the preliminary round of waste item recognition. Next, there is a validation process that is conducted by annotation to catch the items that were not annotated or missed by the machine learning system.

The annotation of image data can be a step by step process (that can be location specific) for a number of classes. Each system 100 can be deployed with a baseline model (embedded model) with an architecture that is optimized for running it on the edge, causing some accuracy trade-offs. The baseline model can be trained at cloud server 160 to initiate the automated annotations pipeline and trained with the same dataset as the systems 100 but with a much deeper architecture (the annotations model), as this can be run on GPUs without the constraint of hardware resources as is on the edge of the system 100, for example.

The automation process can implement the following operations for a given location. All data coming in from a given location can pass through the annotations model, allowing for it to pick up on frames that might have been missed (predictions) by the embedded model and predict items that it has been trained on. This first sweep through the annotations model can allow for a large fraction of unpredicted frames (on the embedded model) to generate predictions, still leaving a certain fraction of frames left unpredicted. This phase can involve validation to check the predicted frame with a certain accuracy threshold to ensure that the less confident predictions are indeed true positives and manually annotate the frames that were missed by both models.

The next phase involves retraining both models (embedded and annotations model) with the newly labelled data points (first by the annotations model and then by the validation stage). Both these models can now replace their previous versions of the models in the workflow. This is one cycle and is restricted only by the resources in terms of our workforce and training hardware. As this cycle is repeated a number of times, the annotations model can become accurate and flexible enough to recognize any item from the trained class list for a given location. Once this is achieved, all new data can simple be piped through the model for annotations.

The same process can be replicated at multiple locations with multiple systems 100 and their datasets, creating multiple annotations model. The collective dataset can then be merged to create more powerful annotations model capable of annotating waste data for any given area.

The sanitization unit 126 implements a process for sanitization of image data where captured frames of waste items are processed using face blurring in the neural prediction engine. The system 100 can transmit the processed images to the cloud server 160 and cloud database 170 where further collective and more robust neural sanitization takes place such as blurring of remaining faces that may have been missed in the previous stage.

In some embodiments, the system 100 implements a process for providing smart waste analytics via the dashboard 306 by aggregating the collected data such as the type of items disposed into each waste stream, volume of individual waste item, monitored volume of each waste receptacle based on the item disposed and calculated diversion rates. The system 100 transmits all collected metadata to the cloud server 160 to be accessed (near) instantaneously.

The I/O unit 602 can enable the system 100 to interconnect with one or more input devices, such as sensor(s) 102, camera(s) 104, a keyboard, mouse, touch screen and a microphone, and/or with one or more output devices such as a display screen 200 and a speaker.

The processor 108 can be, for example, a supercomputer (with an active heat sink) or any type of general-purpose microprocessor or microcontroller, a digital signal processing (DSP) processor, an integrated circuit, a field programmable gate array (FPGA), a reconfigurable processor, or any combination thereof.

Memory 606 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 608 can include memory 606, databases 610 (e.g. graph database), and persistent storage 612.

The communication interface 604 can enable the system 100 to communicate with other components, to exchange data with other components, to access and connect to network resources, to serve applications, and perform other computing applications. The communication interface 604 can include ports, for example. The communication interface 604 can connect to a network 140 (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The system 100 can be operable to register and authenticate users (using a login, unique identifier, and password for example) at dashboard 306 prior to providing access to applications, a local network, network resources, other networks and network security devices. The system 100 can connect to different machines, data sources 150 (linked to databases 160), other systems 100, cloud server 160, and so on.

The data storage 608 may be configured to store information associated with or created by the system 100, such as for example image data, waste item categories, configuration data for the location of the receptacles of the bin 202, advertisement data, reward data, and so on. The data storage 608 may be a distributed storage system, for example. The data storage 608 can implement databases, for example. Storage 608 and/or persistent storage 612 may be provided using various types of storage technologies, such as solid state drives, hard disk drives, flash memory, and may be stored in various formats, such as relational databases, non-relational databases, flat files, spreadsheets, extended markup files, and so on.

FIG. 7 is a diagram of a cloud server 160 depicting an example physical environment. The cloud server 160 can connect to multiple systems 100 to collect data for waste items and generate waste item insights for display at dashboard 306. The cloud server 160 can process waste item data using detection unit 722, use the results to train neural networks 730 (via training unit 726) and generate firmware updates 728 for systems 100 for continuous learning.

The cloud server 160 can include an I/O Unit 702, a processor 704, communication interface 706, memory 708, and data storage 710. The processor 704 can execute instructions in memory 708 to implement aspects of processes described herein. The processor 704 can execute instructions in memory 606 to configure sanitization unit 720, detection unit 722, analytics unit 724, training unit 728, firmware update 728, neural networks 730, and other functions described herein. The system 100 may be software (e.g., code segments compiled into machine code), hardware, embedded firmware, or a combination of software and hardware, according to various embodiments.

In some embodiments, the cloud server 160 implements a process for providing smart waste insights via the dashboard 306 using analytics unit 724 to aggregate the collected data such as the type of items disposed into each waste stream, volume of individual waste item, monitored volume of each waste receptacle based on the item disposed and calculated diversion rates.

The cloud server 160 can implement further sanitization of images to blur head data using sanitization unit 720. The detection unit 722, analytics unit 724, and training unit 728 can implement (at least aspects of) process 300 (FIG. 3) for validating data, retraining system(s) 100 and generating firmware updates 728.

The training unit 728 can train neural networks 730 (and engine) for provision to system 100 (e.g. as firmware updates 728 or initial configurations). Data can be collected for training from sensors and cameras that are placed out into the open, for example. This can be a foundational dataset that can be installed on system 100 when placing the system 100 in new premises. After a designated time interval, the training of identifying waste items particular to the new premises can be implemented and that incremental dataset can be used to improve the foundational dataset. The data can be tagged with an identifier for system 100 to identify a set of data that is particular to a system 100 (or location, for example). Waste items in a new environment can be understood by placing the foundational dataset, that is being incrementally improved, and through training, learns to grow its neural prediction engine for the specific premises.

Frames fed to the training unit 728 for retraining can occur at regular intervals after sanitization has been thoroughly executed. A batch of frames that have been sanitized and annotated by a process of validation can be fed into the training unit 728 for retraining and the latest updated model will be sent for firmware updates 728.

Further example details relating to I/O Unit 702, a processor 704, communication interface 706, memory 708, and data storage 710 are described in relation to similarly named components of FIG. 6, for example.

The analytics unit 724 can compute different waste item metrics such as is described in relation to analytics unit 122 (FIG. 6), for example. The analytics unit 724 can compute different waste item metrics for display at dashboard 306.

For example, analytics unit 724 can compute metrics for the monitored volume of each receptacle based on the item disposed. As mentioned above, when each item is identified, a record of the item's dimensions are stored and added onto the volume of the receptacle it was designated. A confirmation of the item disposed in the correct receptacle acts as a crosscheck of the volume of each receptacle. For example, analytics unit 724 can compute metrics for calculated diversion rates. As mentioned above, the daily diversion rates can be calculated as follows:

$$\frac{\sum(\text{Volume of Organics Receptacle} + \text{Volume of Recyclable Receptacle} + \text{Volume of } X \text{ Waste Stream})}{\text{Volume of All Receptacles (includes landfill)}}$$

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In another aspect, embodiments can relate to a waste bin, and more particularly to a waste bin with automated detection and routing of waste items into appropriate receptacles.

Figure 10:
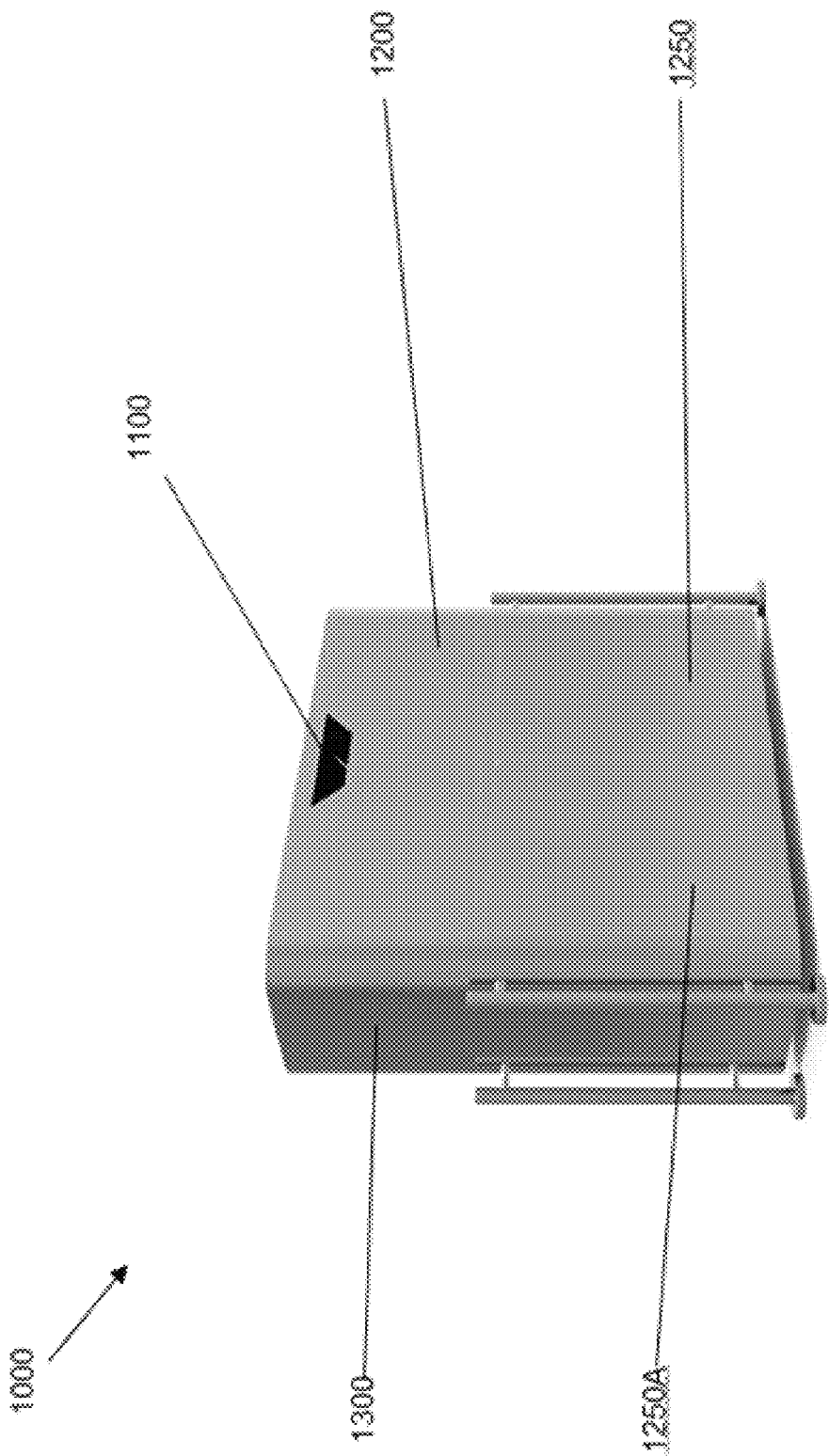
FIG. 10 is a front perspective view of a waste bin according to another embodiment.
Figure 11:
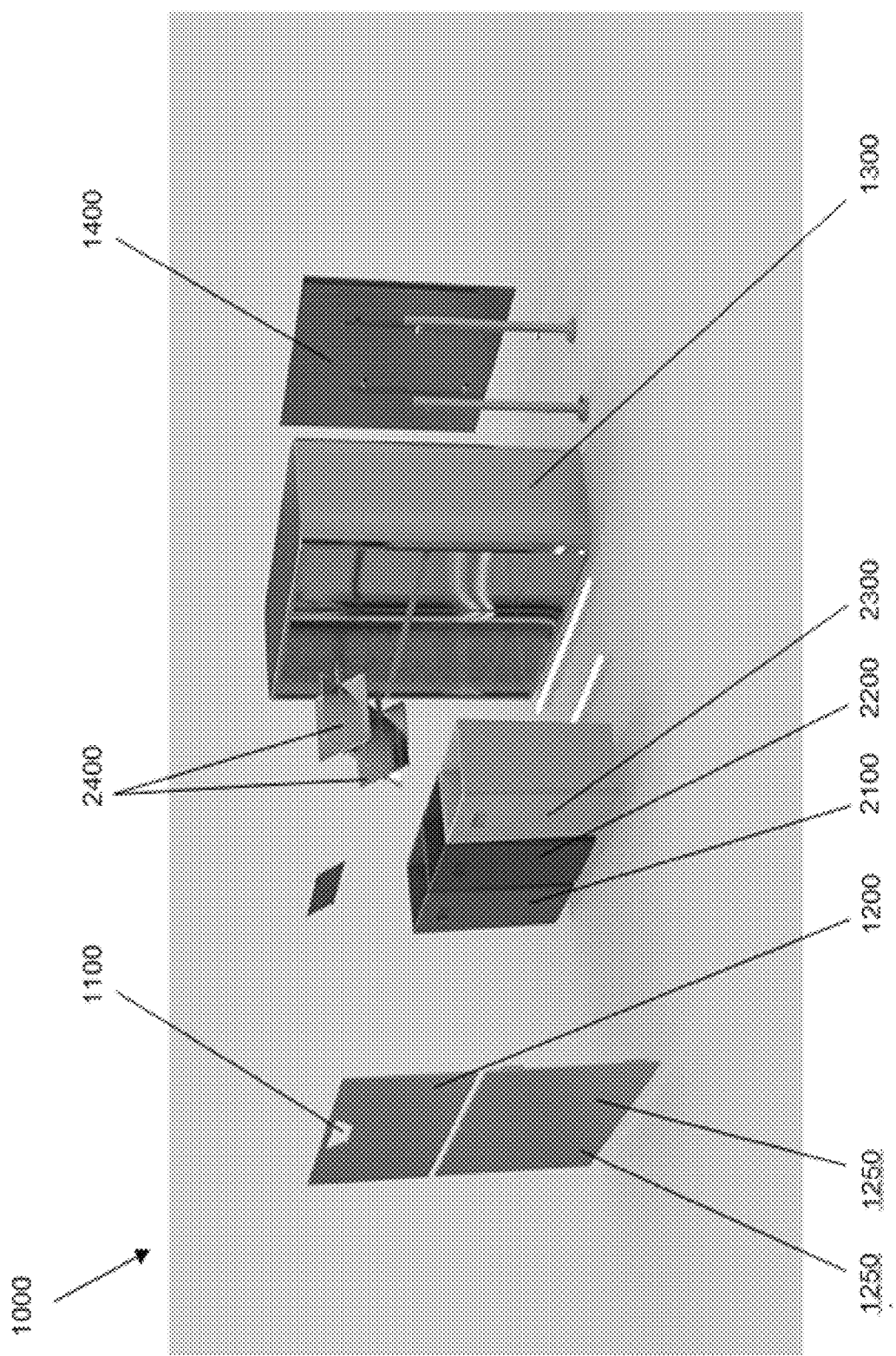
FIG. 11 is an exploded view of the waste bin of FIG. 10.
Figure 12:
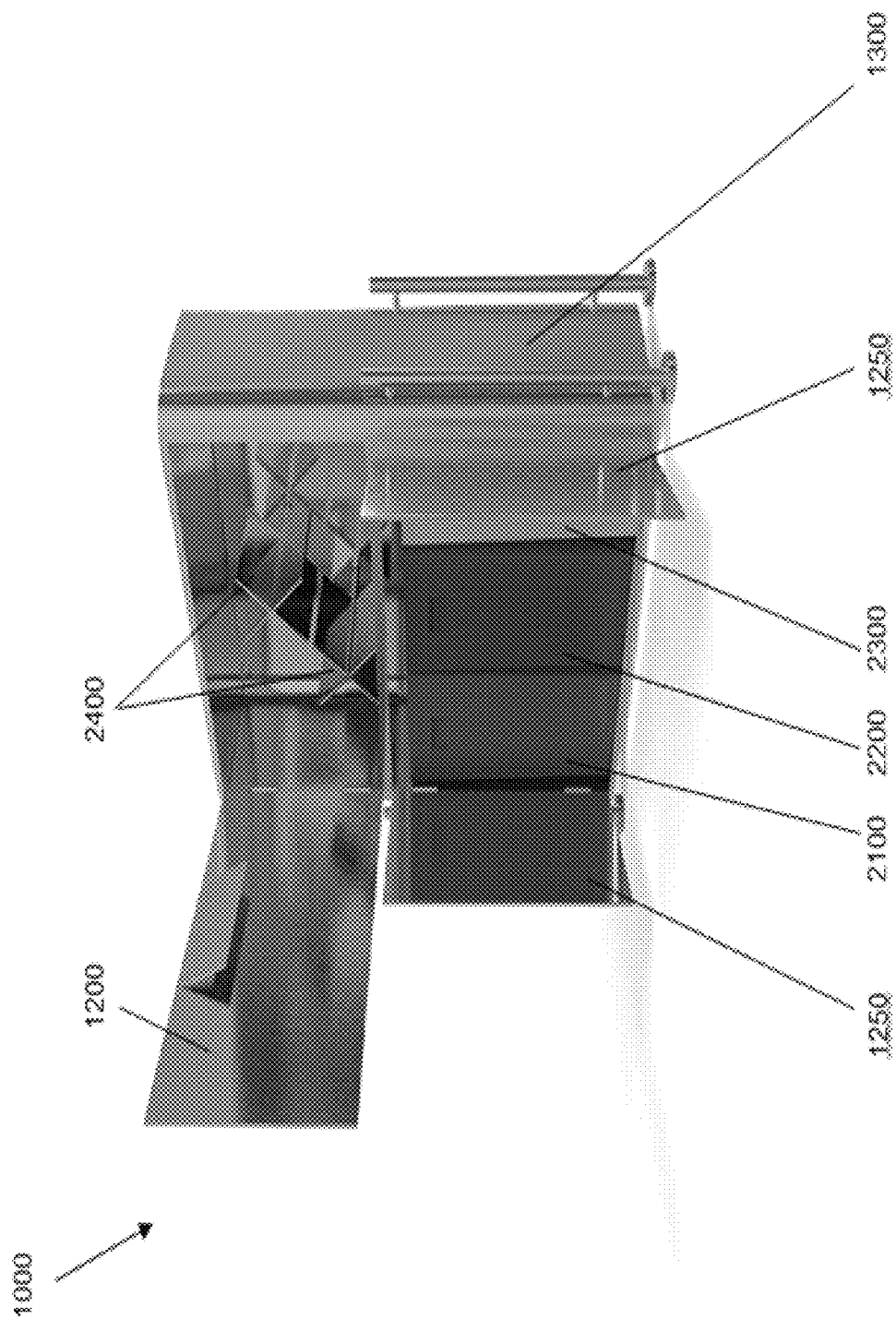
FIG. 12 is a front perspective view a waste bin in an open state according to an embodiment.

According to an embodiment as shown in FIG. 10 a waste bin 1000 may have a single opening 1100 for receiving waste (or the system 100, for example). As shown in FIG. 11, within waste bin 1000 may be separate receptacles 2100, 2200, 2300 for receiving different categories of waste. For example, receptacle 2100 may be for recyclable waste, receptacle 2200 may be for compostable waste, and receptacle 230 for all other waste. The number of receptacles and categories of waste received therein may vary according to local (municipal) standards for waste collection and recycling.

Waste bin 1000 may be defined by a casing formed from front panels 1200, 1250A, and 1250B, frame 1300, and rear panel 1400 to create an enclosure. As shown, waste bin 1000 is a rectangular prism, however, other shapes, such as oval prisms, cylinders and cubes may be used as well. Receptacles 2100, 2200 and 2300 are disposed in the lower portion of waste bin 100, with a diverter 2400 in the upper portion which acts to direct waste items inserted into opening 110 into the appropriate one of the receptacles 2100, 2200, 2300 according to the type of waste. FIG. 10 shows the waste bin 1000 assembled with the front panels 1200, 1250A, and 1250B open. In FIG. 10, front panels 1250A and 1250B form two halves to provide access. However, front panels 1250A and 1250B could alternatively form a single piece, as this may enable bin 1000 to be more easily manufactured or accessed.

Diverter 2400 may include an imaging system (or integrate with system 100) to take an image of the waste item inserted into the waste bin 1000. The imaging system may include one camera or multiple cameras or may be a sensor suite which may contain one camera or multiple cameras or other devices. The imaging system may include ultrasonic sensors and spectrometers, to further assist in the identification of the waste item or to provide other desired information. The sensor data may be included in metadata and associated with the image. The imaging system may be mounted on a holder suspended from the underside of the top of frame 1300. The holder of the imaging system may alternatively be secured to any surface of bin 1000 so that the sensors or cameras of the imaging system are able to image or sample items which have come or are coming through opening 1100. The imaging system output is then analyzed to determine the waste type of the waste item and this information may be used to control the diverter 2400 such that the waste item is directed into the appropriate receptacle without any user intervention.

Bin 1000 may include a supplemental sensor suite of cameras or other sensors within the interior of bin 1000 for waste level detection and material composition detection.

Figure 14:
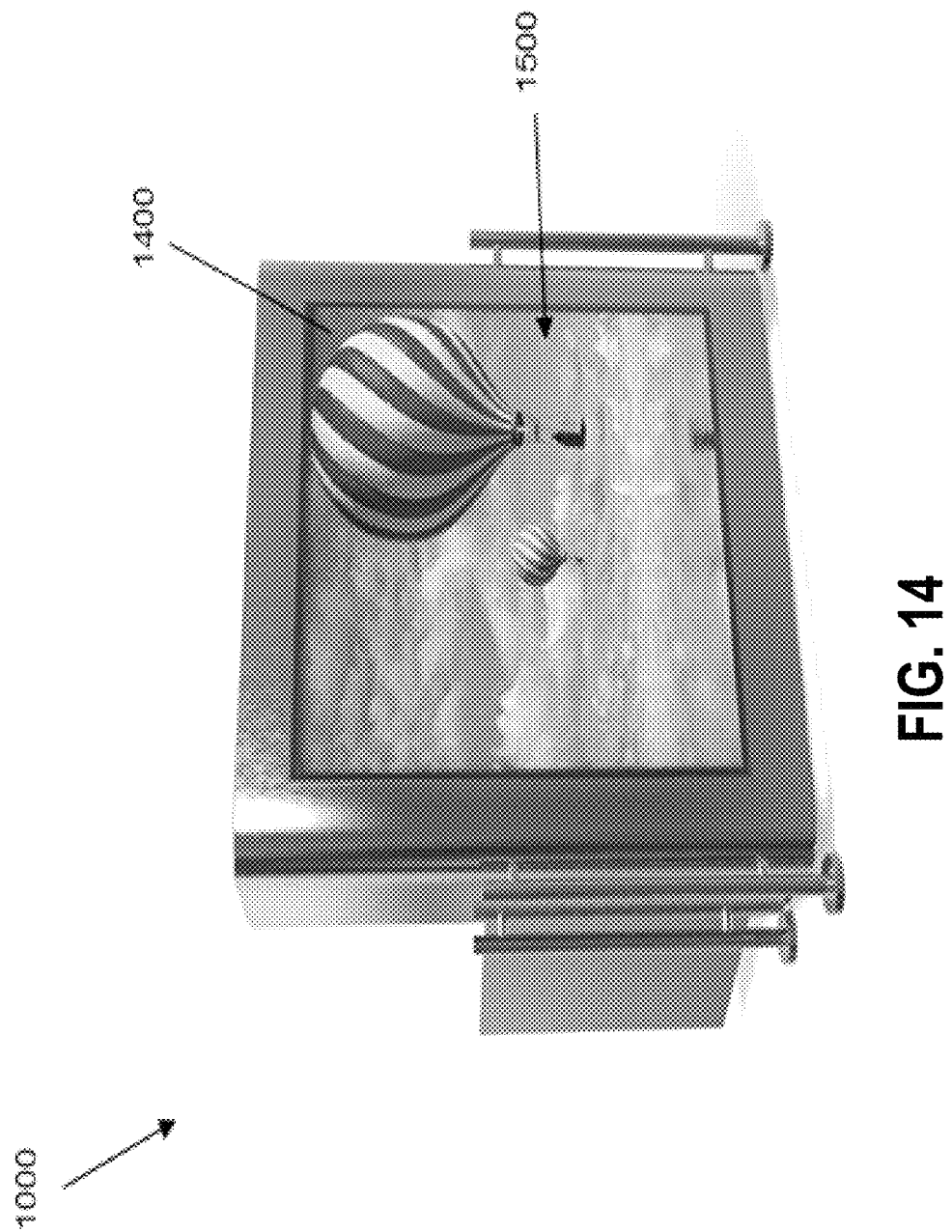
FIG. 14 is a rear perspective view of a waste bin according to an embodiment.
Figure 15:
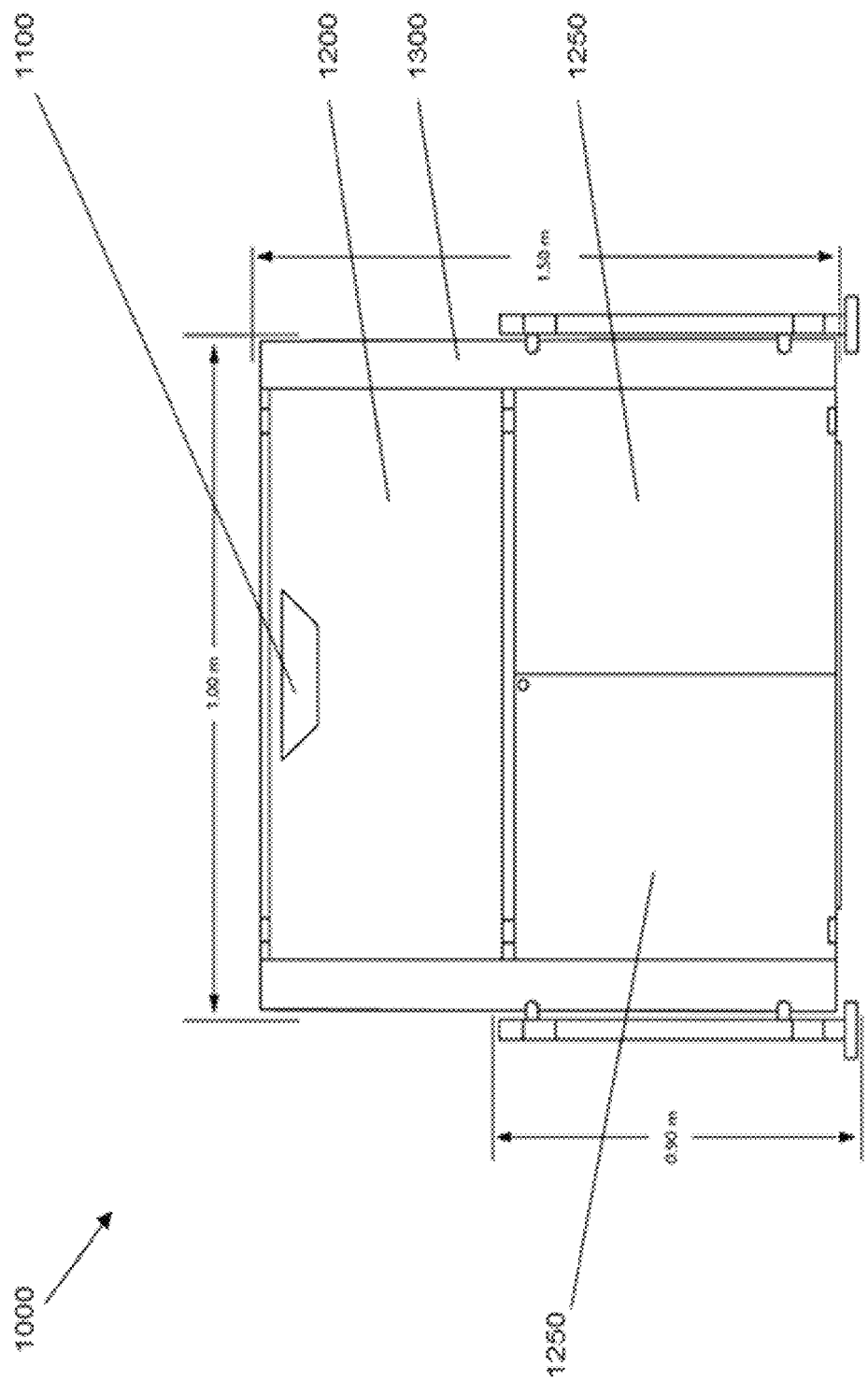
FIG. 15 is a front view of a waste bin according to an embodiment.
Figure 16:
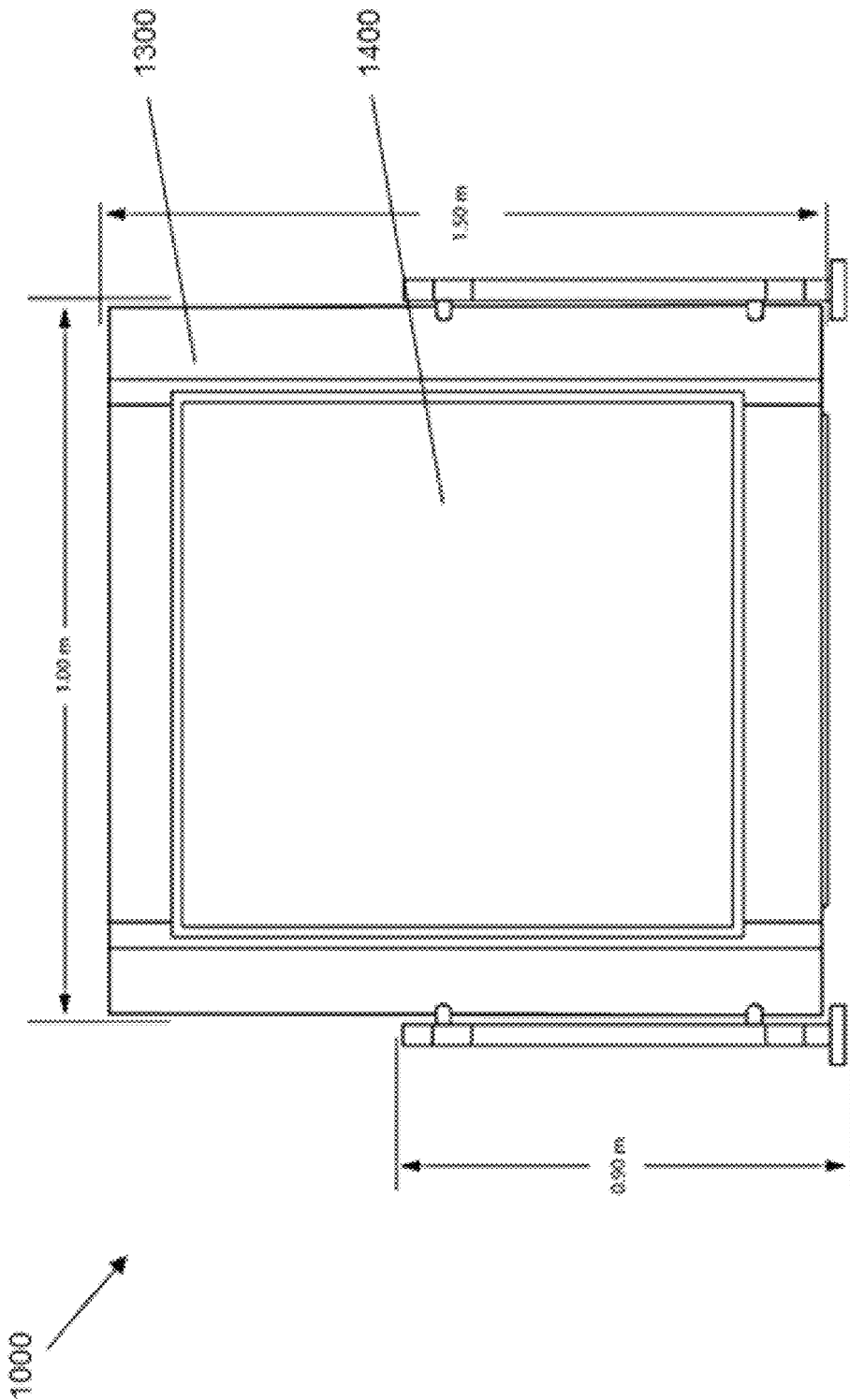
FIG. 16 is a back view of the waste bin of FIG. 15.
Figure 17:
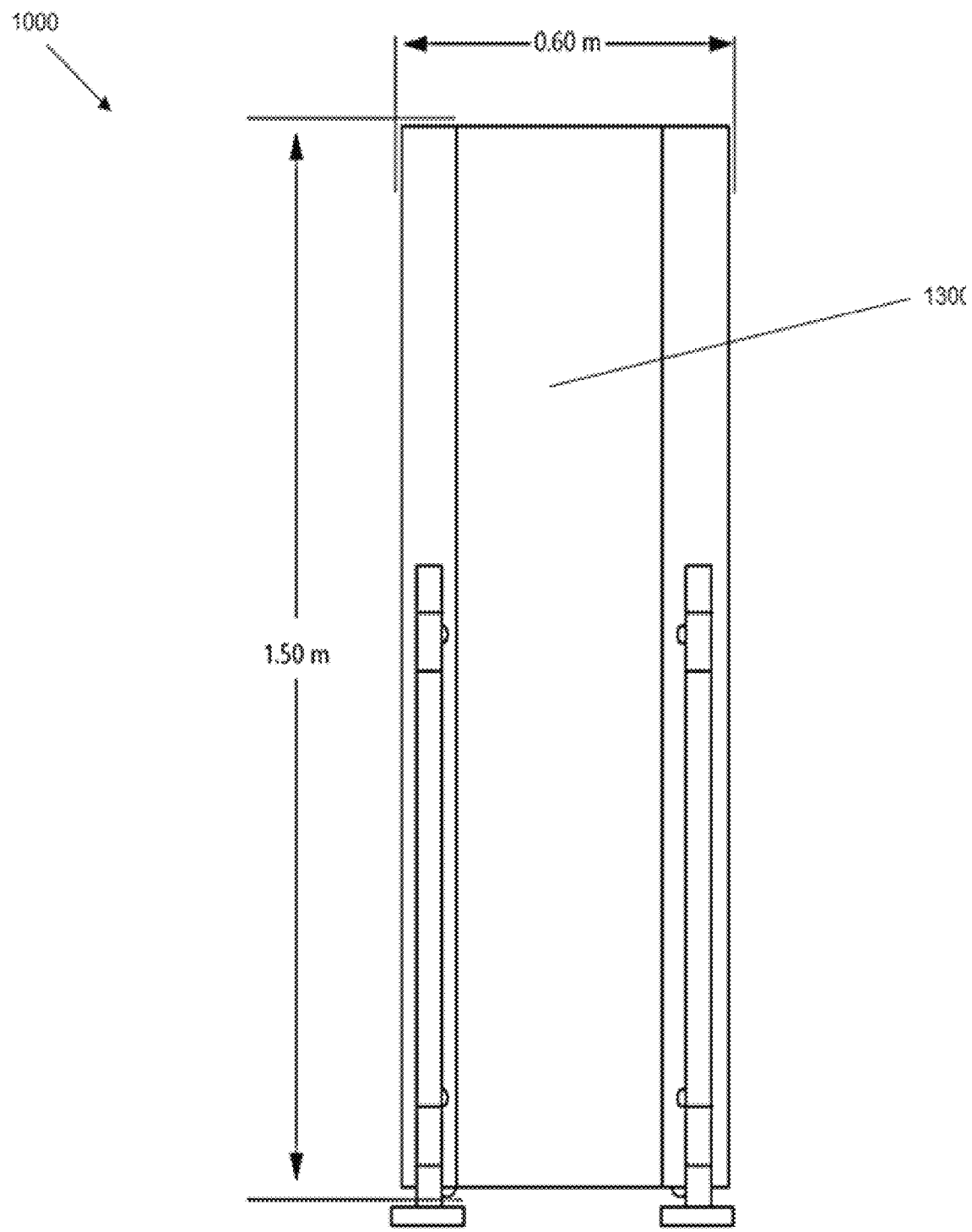
FIG. 17 is a side view of the waste bin of FIG. 15.
Figure 18:
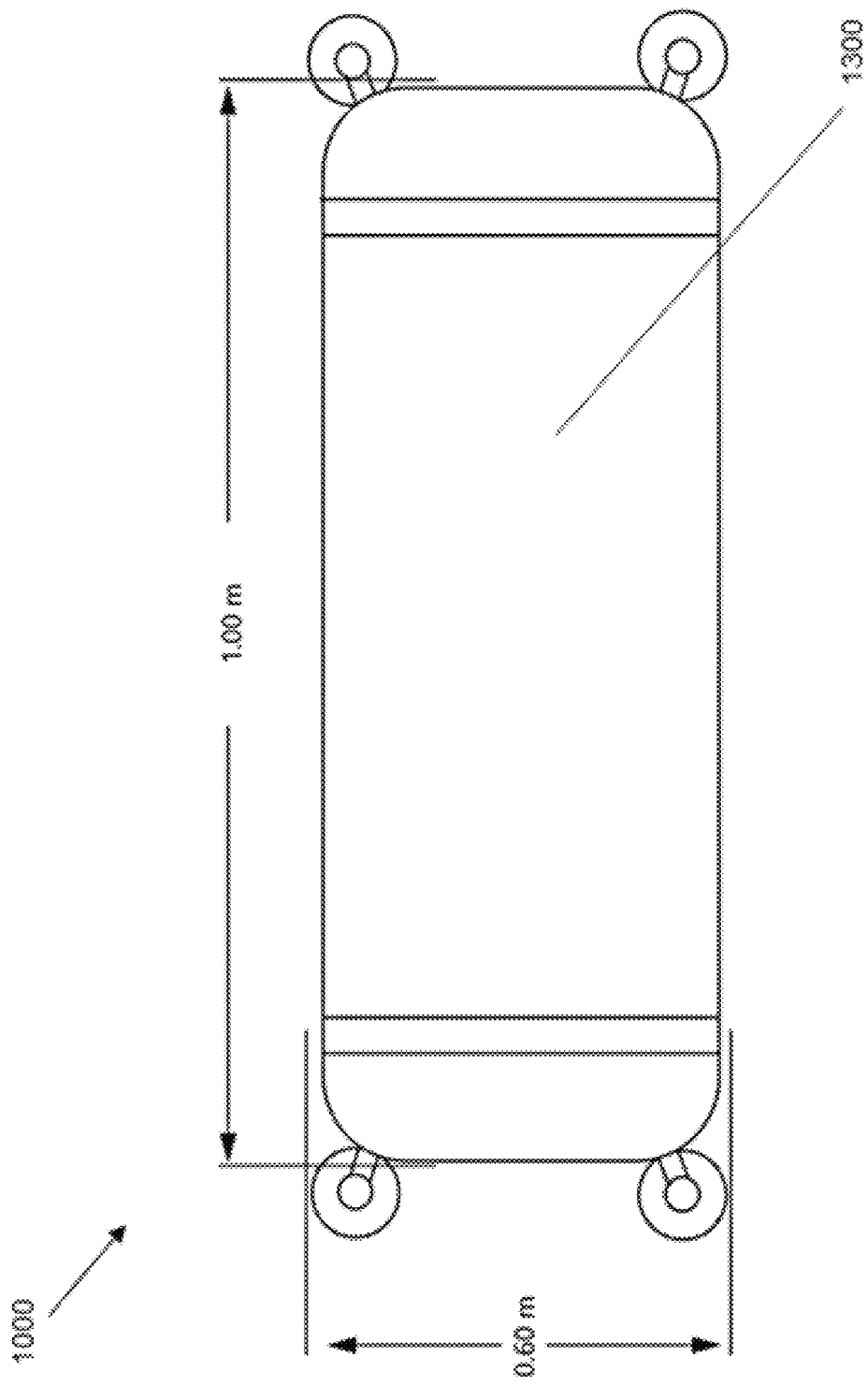
FIG. 18 is a top view of the waste bin of FIG. 15.
Figure 19:
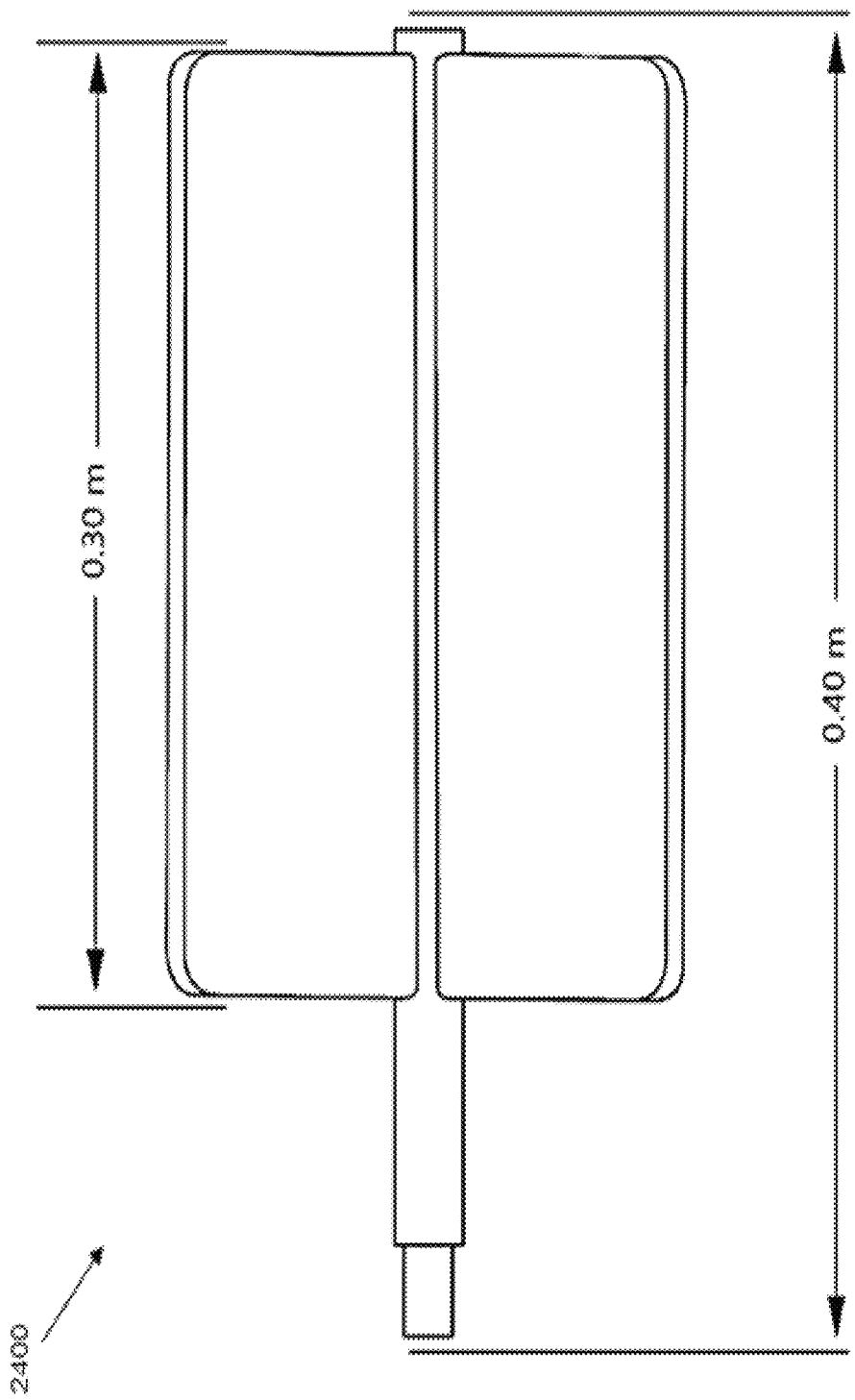
FIG. 19 is a side view of a X-fin according to an embodiment.
Figure 20:
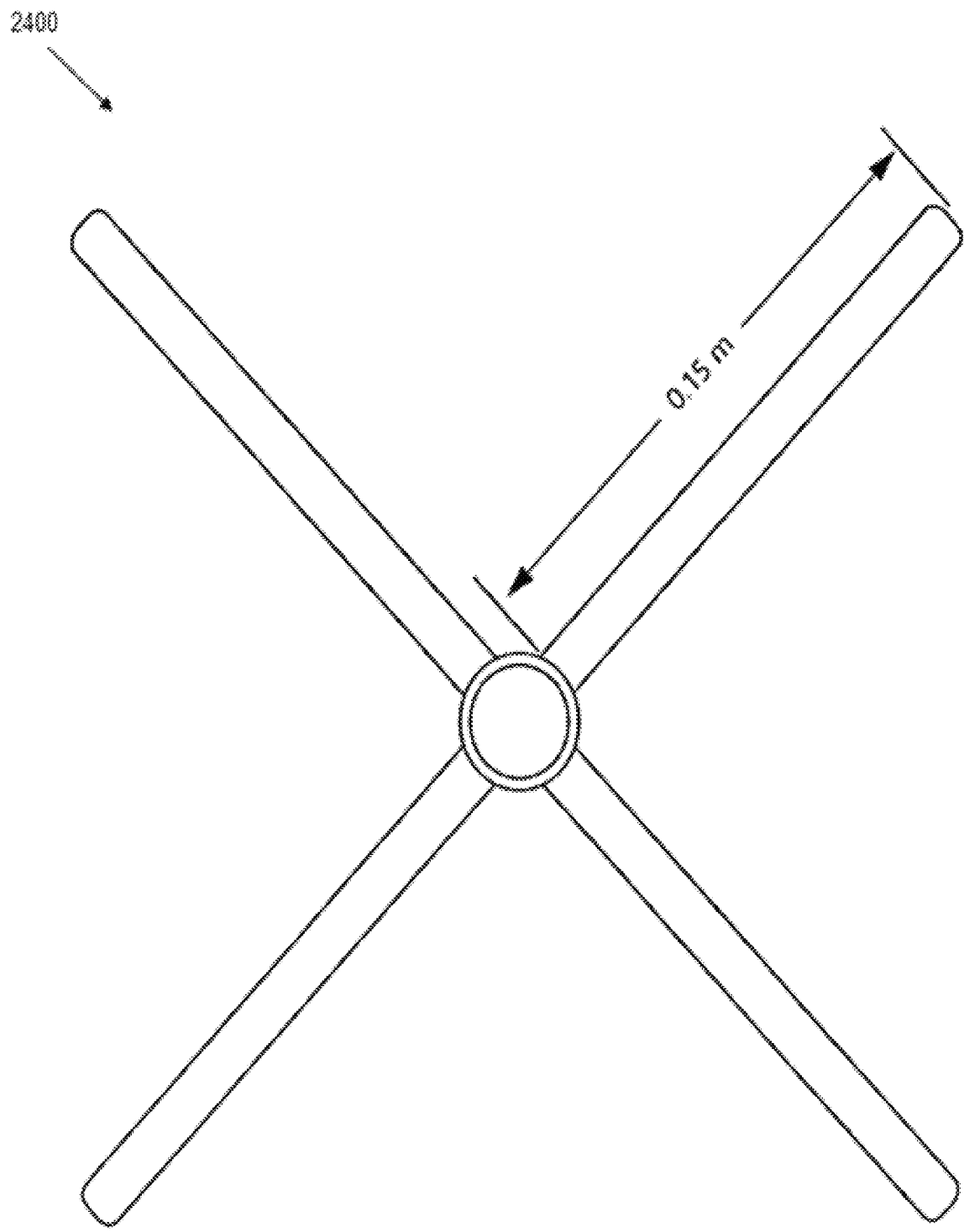
FIG. 20 is an end view of the X-fin of FIG. 19.

As shown in FIG. 14, an external surface such as rear panel 1400 may further include an audio/visual display 1500 to present information to users. Such information may include instructions for using the waste bin 1000, information on the local categorizations, or general advertising.

Figure 13:
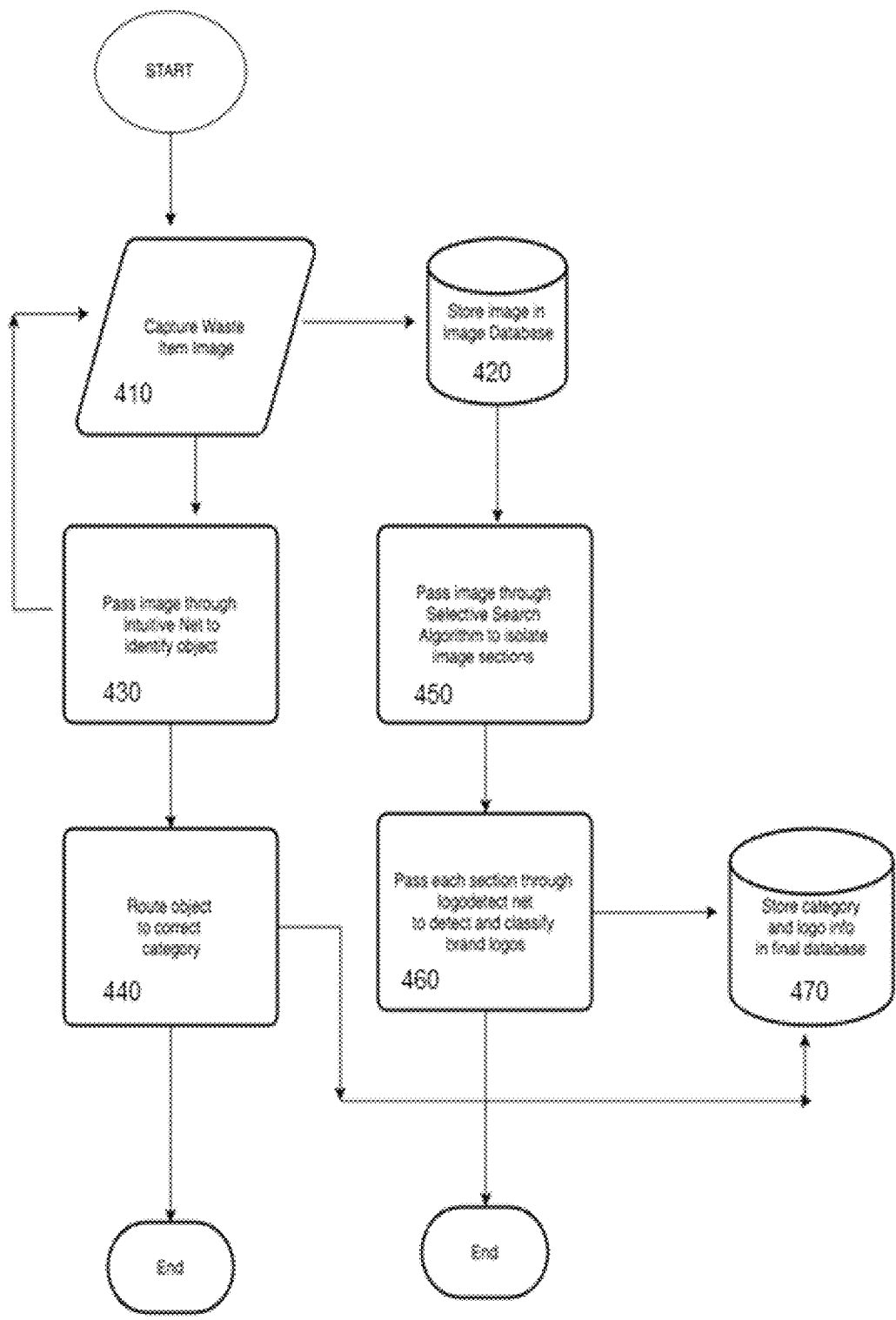
FIG. 13 is a flow chart of a waste item analysis process according to an embodiment.

As shown in FIG. 13, an item routing process may begin by capturing an image of the waste item at step 4100. The image is captured when the user disposes of a waste item through the opening 1100 in the waste bin 1000. The imaging system may first create the appropriate lighting conditions to capture an image of the item using the camera and/or other sensors or lighting devices. The imaging system may then capture an image (or other sample) of the item using the camera and/or other sensors. The image is then stored (step 4200) in a database, which may be local to bin 1000 or remote to bin 1000. Prior to the image being stored in step 4200, it may be labeled with a time stamp or location stamp or other metadata such as data obtained by ultrasonic sensors or spectrometers.

The image may then be passed through an image classification neural network (step 4300) to identify the waste item captured therein. The image classification neural network identifies the item (e.g. a plastic bottle) and determines the appropriate category and receptacle for the item (e.g. recycling). The neural network may vary in layer depth.

As indicated by the arrow in FIG. 13 from the step of passing an image through an item identification network (step 4300) to the step of capturing a waste item image (step 4100), the system may be in continuous detection mode to capture images and identify items. The system may only trigger the step of routing the item (step 4400) when an item is placed in bin 1000 and identified as an item. In some embodiments, the system remains in detection mode regardless of whether an item is being routed or other steps, such as the steps indicated in FIG. 13, are being taken.

Training data for the neural network may be provided initially from existing image databases, which may be subsequently augmented using images, such as curated images, of real waste items. Collection of training data may also be a continuous process, and may be facilitated by gathering images from every location where a waste bin 1000 is placed. Each bin location may be monitored closely for the waste data it collects in a pre-determined period of time, such as over the course of a day. This data may be used to train the networks and may also be gathered one or more database for other purposes, such as monitoring waste disposal volume or redirection efficiency. The system may be retrained periodically as new data is introduced, further strengthening the network capabilities.

In an event where a complex item (ex: an item, or collection of items disposed of together, which includes organics, recyclables, and landfill items) is disposed into the single opening 1100, the algorithm may look to the category with the highest surface area and make a routing decision in favour of the category that would benefit most from receiving this complex item.

In an event where it is determined that a waste item has been miscategorised, the system may be retrained by adding the corrected data into the network to ensure the same error is not repeated twice. The frequency of the training may determine the overall efficiency of the system, with more frequent training leading to greater efficiency.

Once identified, the item may be routed (step 4400) to the appropriate receptacle (2100, 2200, 2300) within the waste bin 1000. According to a routing algorithm adjusted for the local waste disposal regulations, such as local municipal waste management regulations, a signal is sent to diverter 2400 to position or adjust or operate it such that the waste item is routed to the appropriate receptacle. As shown in FIG. 11, the diverter 2400 may include X-shaped fins ('X-fins') which are rotated to create a route for the waste item to the appropriate receptacle and, if necessary, provide a motive force to move it along the route. For example, once the disposed item has been identified, the routing algorithm may direct bin 1000 to power up the right motors to turn the appropriate X-fin buffer or buffers. The motor or motors may then turn the appropriate buffer or buffers to the right or left based on the category identified, to direct the item into the correct receptacle. The final categorization of the waste item may then also be associated with the captured image, which may be stored in one or more databases.

The X-fin motors and other powered components of bin 1000 may be electrically powered. Power may be provided by sources such as batteries or solar panels, or may be provided by standard 120/240 V wall power.

An image or other sensor data taken by the imaging system and stored in the image database in step 4200 may be further processed to extract useful information. For example, there may be value in extracting branding information and providing this information to third parties; information concerning the brands of the items being thrown away. In some embodiments, the provision of branding information could be provided to third parties for a fee or could be included in an audit. At step 4500 the image stored in the image database may be passed through a selective search algorithm to isolate brand information. This may include isolating different areas of the image for processing, and may also create new image objects for analysis. This process may take place in parallel with the item identification and routing process or may take place subsequent to the identification and routing process.

For example, the item recognition neural network may recognize branding information in addition to category determination, and may apply branding information as metadata to the image.

However, branding information can be extracted from an image subsequently to the routing process. For example, once an image of a waste item has been categorized for appropriate routing, the image may be sent at step 4200 to an image database, which may be an external central database serving a plurality of bins. From the image database the image may be drawn to be processed by a neural network for the detection and classification of branding or logos at step 4600. The brand recognition neural network drawing the images from the image database for branding detection may be the neural network used for item routing or may be an additional neural network, such as a central neural network dedicated to brand detection and identification. This brand recognition neural network may vary in layer depth.

The use of the image categorization neural network for brand recognition may reduce the cost and complexity of the process. However, the use of a second neural network, which may be a central neural network common to a plurality of bins, may be desirable as the categorizing and routing of an object is time sensitive. As brand recognition may not be as time sensitive as item identification and may require a higher accuracy, having a second network on the back end dedicated to this operation may allow the system to take additional time to ensure a high level of brand recognition accuracy and to thoroughly analyze the entire image to extract as much branding information as is desired.

A full image may be relatively large, and step 4600 may require that an image be thoroughly searched to locate a brand logo in order to run a recognition algorithm on it. Accordingly, step 460 may involve breaking the image down into multiple area-wise chunks. The use of multiple area-wise chunks may assist in examining all parts of the image in analyzing for brand details. The images of disposed items are broken down into smaller areas or area wise chunks using a selective search algorithm which may break an image down into smaller components based on similarities in parts of the image. For example, a green logo on a white cup may be a distinctive feature; the selective search algorithm catches this delta and separates the image into two chunks: a white area and a green area. The selective search algorithm may be used to separate images into multiple sub-images based on color differences or deltas. The brand recognition neural network analyzes each chunk to recognize brands that may be present on the surface of the chunk.

In some embodiments, the imaging system may include multiple cameras or other sensors positioned to take images or sensor data from multiple angles around an item at step 4100. In addition to helping the item identification neural network identify the item, this may ensure that branding data found anywhere on an item is located to be added to the item.

In some embodiments, the brand recognition and item identification processes may include an ensemble approach. The use of an ensemble approach (the use of multiple learning algorithms to obtain better predictive performance) with the neural network or neural networks may ensure a higher accuracy of item identification or brand recognition.

Brand recognition data may be periodically collected, such as every few hours or every day, and added as metadata to the image in the image database or may added to a central repository or other branded image database.

The image identification and brand information processes may also gather other information for association with the image or sensor data, such as the volume of the container (if appropriate) or the UPC code of the waste item (if visible). This information may help with auditing and may also have value for external purposes, including value in combination with branding information. All information gathered is tagged as image information data and sent to the image database for association with the image.

The master image database may then contain, for each waste item, the captured image, associated capture metadata (time and location), the categorization for routing, and any image information data gathered (branding, logo, size, UPC, etc.).

In addition to on-site data collection for retraining, the neural network may also be trained via gathering of external data through a mobile application running on camera-based device (phone, tablet, etc.). A user may point the device at any item and get predictions on what the neural network thinks it is seeing. The user may then identify any errors, and feed the correct data (either as original, or user-corrected) into the system for retraining, hopefully avoiding and reducing on-site errors. The application can also be capable of downloading images that have been taken before for the purposes of annotating the images on the device.

Information classified, labeled, and stored in databases, including information gathered by bins 1000 and information gathered by mobile applications, may be used in a variety of ways in addition to use in training the neural network. This information may be used by bin 1000 to classify and redirect items. This information may be used in audits, such as audits of diversion/recycling efficiency. This information may also be used by consolidated reporting systems reporting waste data, such as reporting waste data to a sustainability department.

In some embodiments, bin 1000 may also include exterior cameras or other sensors. Exterior cameras or sensors may be used to improve the security of bin 1000 or to detect demographic information of persons depositing items into bin 1000. A neural network, such as the image identification neural network, the branding identification neural network, or an additional network, may be used to detect demographic information such as estimated age, ethnicity, and gender of persons depositing items into bin 1000. This demographic information could in some embodiments be associated with branding information and provided to third parties, including providing the information to third parties for a fee or as part of auditing information.

Systems or processes involving bin 1000 or multiple bins may be able to provide real-time demographic and consumption information which may be of value, such as to those managing brands, auditing waste disposal, etc.

According to an embodiment, there is provided a waste bin with automated detection and routing of waste items into appropriate receptacles.

According to an embodiment, there is provided a waste bin, comprising: a casing with an opening for inserting a waste item; two or more receptacles disposed within the casing operative to receive waste items; a diverter disposed with the casing operative to direct the waste item into one of the receptacles; and an imaging system coupled to the diverter, the imaging system operative to image the waste item, perform image analysis on the image to determine an appropriate receptacle for the waste item from the two or more receptacles, and set the diverter to direct the waste item into the appropriate receptacle.

In some embodiments, the imaging system further includes an ultrasonic sensor and a spectrometer.

In some embodiments, the imaging system further sends the image to a storage database.

In some embodiments, the image is provided with associated metadata prior to being sent.

In some embodiments, the metadata includes one or more of: time of image capture, location of image capture, and category of waste item.

According to an embodiment, there is provided a method of routing a waste item into a receptacle, comprising: imaging the waste item to generate an image; analyzing the image using a neural network to determine a category for the waste item; determining an appropriate receptacle for the waste item based on the category; and sending a signal indicating the appropriate receptacle for the waste item.

In some embodiments, the method includes sending the image to a storage database.

In some embodiments, the method includes attaching metadata to the image prior to sending the image to the storage database.

In some embodiments, the metadata includes one or more of: time of image capture, location of image capture, and category of waste item.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for waste item detection comprising:
   sensors for detecting an approaching object to trigger a camera to capture image data and one or more processors to process the image data;
   the camera for capturing image data of the approaching object;
   non-transitory computer readable storage medium with executable instructions for causing the one or more processors to:
   process the image data using a neural network to detect a waste item within the image data and determine a category for the waste item, wherein the neural network defines classes for different waste items and maps the detected waste item to the classes for the different waste items to compute a pairing of the detected waste item and a class, the class being associated with the category for the waste item; and
   generate feedback data indicating the category for the waste item;
   wherein the camera or the sensors capture additional data indicating disposal of the waste item, wherein the one or more processors use the additional data to determine whether the waste item was disposed in the appropriate receptacle, and generates additional feedback data based on the determination.

2. The system of claim 1 wherein the one or more processors are configured to use the neural network to estimate a location of a head of the object within the image data and detect the waste item in the image data using the estimated location of the head within the image data, wherein the neural network is trained using image data to define data points for person features, waste items, background and environment.

3. The system of claim 2 wherein the one or more processors are configured to use the neural network to detect data points within the image data, the data points corresponding to a set of the person features, the set of the person features defining head features for estimating the location of the head of the object.

4. The system of claim 2 wherein a portion of the data points corresponding to the background and the environment for filtering the image data to focus on the detected waste item.

5. The system of claim 2 wherein the one or more processors are configured to use the neural network estimate a location of hands within the image data based on the location of the head and detect the waste item in the image data using the estimated location of the hands within the image data.

6. The system of claim 1, wherein the one or more processors determine an appropriate receptacle to dispose of the detected waste item, and wherein the feedback data comprises an indication of the appropriate receptacle to dispose of the detected waste item.

7. The system of claim 6 wherein upon determining that the waste item was disposed in the appropriate receptacle, the one or more processors generate a reward for redemption as the additional feedback.

8. The system of claim 1 wherein the one or more processors transmit the feedback data to a display device for displaying the feedback data.

9. The system of claim 1 wherein the neural network is trained through consecutive object detection to determine the appropriate receptacle that the waste item should be disposed.

10. The system of claim 1 wherein the one or more processors are configured to measure closeness of a user to the appropriate receptacle.

11. The system of claim 1 wherein the sensors detect the approaching object by computing a continuous decrease in signal range for the approaching object.

12. The system of claim 1 wherein the one or more processors are configured to use the neural network estimate a location of hands within the image data and detect the waste item in the image data using the estimated location of the hands within the image data.

13. The system of claim 12 wherein the neural network is trained using image data to define data points for person features, waste items, background and environment.

14. The system of claim 13 wherein the one or more processors are configured to use the neural network to detect person features within the image data, the person features defining hand features or head features for estimating the location of the hands.

15. The system of claim 13 wherein the one or more processors are configured to use the neural network to detect regions of the image data as background and environment and filter the regions of the image data to focus on the waste item in the image data.

16. The system of claim 1 wherein the one or more processors are configured to detect head data within the image data and blur the head data to generate sanitized image data.

17. The system of claim 16 wherein the neural network is trained using image data to define data points for person features, wherein the person features define head features for detecting the head data within the image data.

18. The system of claim 1 wherein the one or more processors are configured to tag the image data with metadata indicating a system identifier, category for the waste item, location data, and time data.

19. The system of claim 1 further comprising a cloud server configured to receive the image data tagged with metadata indicating the category for the waste item.

20. The system of claim 19 wherein the cloud server is configured to process the image data to detect head data within the image data and blur the head data to generate sanitized image data.

21. The system of claim 1 further comprising a cloud server configured to receive the image data tagged with metadata indicating the category for the waste item, validate the image data, generate a firmware upgrade for the neural network, and transmit the firmware upgrade to the one or more processors to update the neural network.

22. The system of claim 1 wherein the one or more processors are configured to compute image analytic data including types of waste items, volume of individual waste item, monitored volume of each receptacle based on the waste items disposed, and calculated diversion rate.

23. The system of claim 1 wherein the one or more processors are configured to use the neural network or an additional neural network to detect brand data within the image data and tag the image data with metadata indicating the brand data.

24. The system of claim 23 wherein detection of the brand data triggers the one or more processors to generate display data for display at a display device, wherein the display data is at least one of:
   advertisement data; and
   feedback data based on the brand data.

25. The system of claim 23 wherein the neural network or the additional neural network are configured to separate the image data into sub-image data to detect the brand data that may be present in the sub-image data.

26. The system of claim 1 further comprising a brand unit configured to apply a brand image classifier to the image data to detect brand data and tag the image data with metadata indicating the brand data.

27. A system for waste item detection comprising:
   sensors for detecting an approaching object to trigger image processing for detection and recognition;
   a camera for capturing image data of the approaching object;
   non-transitory computer readable storage medium with executable instructions for causing one or more processors to:
      process the image data using a neural network to detect a waste item within the image data and determine a category for the waste item;
      determine an appropriate receptacle to dispose of the detected waste item; and
      generate feedback data indicating the category for the waste item;
   wherein the camera or the sensors capture additional data indicating disposal of the waste item, wherein the one or more processors use the additional data to determine whether the waste item was disposed in the appropriate receptacle, and generates additional feedback data based on the determination;
   wherein the one or more processors are configured to use the neural network or an additional neural network to detect brand data within the image data and tag the image data with metadata indicating the brand data.

* * * * *